United States Patent
Xu et al.

(10) Patent No.: US 11,096,184 B2
(45) Date of Patent: Aug. 17, 2021

(54) DATA PROCESSING METHOD, TERMINAL DEVICE, AND BASE STATION

(71) Applicant: HUAWEI TECHNOLOGIES CO., LTD., Shenzhen (CN)

(72) Inventors: Haibo Xu, Beijing (CN); Nathan Edward Tenny, San Diego, CA (US); Yiru Kuang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/492,969

(22) PCT Filed: Mar. 24, 2017

(86) PCT No.: PCT/CN2017/078199
§ 371 (c)(1),
(2) Date: Sep. 11, 2019

(87) PCT Pub. No.: WO2018/165995
PCT Pub. Date: Sep. 20, 2018

(65) Prior Publication Data
US 2020/0068581 A1   Feb. 27, 2020

(30) Foreign Application Priority Data
Mar. 13, 2017   (CN) .......................... 201710147480.8

(51) Int. Cl.
*H04W 72/08* (2009.01)
*H04L 1/18* (2006.01)
(Continued)

(52) U.S. Cl.
CPC ......... *H04W 72/085* (2013.01); *H04L 1/1841* (2013.01); *H04L 49/552* (2013.01); *H04W 80/08* (2013.01)

(58) Field of Classification Search
CPC ... H04W 72/085; H04W 80/08; H04W 76/14; H04W 76/27; H04W 80/02; H04W 88/04; H04W 24/00; H04L 1/1841; H04L 49/552
See application file for complete search history.

(56) References Cited

U.S. PATENT DOCUMENTS 8,396,037 B2 *  3/2013  Wu ........................ H04W 76/19
                                              370/331
9,749,903 B2 *  8/2017  Zhang ................... H04W 36/04
(Continued)

FOREIGN PATENT DOCUMENTS

CN      101374331 A      2/2009
CN      104955064 A      9/2015
(Continued)

OTHER PUBLICATIONS

Huawei, "Report of email discussion [96#57] [LTE/FeD2D]—Adapter layer and bearer handling", 3GPP TSG-RAN WG2 Meeting #97, R2-1701133, Feb. 13-17, 2017, total 10 pages, Athens, Greece.
(Continued)

*Primary Examiner* — Ivan O Latorre
(74) *Attorney, Agent, or Firm* — Maier & Maier, PLLC

(57) ABSTRACT

A data processing method and a terminal device and a base station. The method includes: the terminal device determines to change the type of at least one wireless carrier of the terminal device from a first type to a second type and discards a radio link control protocol RLC and/or an RLC service data unit buffered by a transmit side of an RLC entity of at least one radio bearer. The terminal device assembles an RLC protocol data unit received by a receive side of the RLC layer entity of at least one radio bearer into an RLC service data unit, and delivers the RLC service data unit to an upper layer entity of the RLC layer entity, where the
(Continued)

upper layer entity is an upper layer entity of the RLC layer entity before the type of the at least on radio bearer is changed.

7 Claims, 16 Drawing Sheets

(51) Int. Cl.
*H04L 12/939* (2013.01)
*H04W 80/08* (2009.01)

(56) References Cited

U.S. PATENT DOCUMENTS

| | | | | |
|---|---|---|---|---|
| 2003/0206534 A1* | 11/2003 | Wu | ...... | H04W 28/06 370/328 |
| 2007/0110101 A1* | 5/2007 | Wu | ...... | H04L 1/1874 370/469 |
| 2008/0069142 A1* | 3/2008 | Wu | ...... | H04W 36/02 370/469 |
| 2009/0034476 A1* | 2/2009 | Wang | ...... | H04W 36/0011 370/331 |
| 2009/0046659 A1* | 2/2009 | Sebire | ...... | H04W 36/02 370/331 |
| 2009/0168723 A1* | 7/2009 | Meylan | ...... | H04L 1/1874 370/331 |
| 2009/0316664 A1* | 12/2009 | Wu | ...... | H04W 76/19 370/336 |
| 2009/0318127 A1* | 12/2009 | Yi | ...... | H04L 1/1829 455/422.1 |
| 2010/0136963 A1* | 6/2010 | Yi | ...... | H04L 1/1877 455/422.1 |
| 2011/0299681 A1* | 12/2011 | Kubota | ...... | H04L 1/1607 380/247 |
| 2012/0099525 A1* | 4/2012 | Maheshwari | ...... | H04L 63/068 370/328 |
| 2012/0201228 A1* | 8/2012 | Wu | ...... | H04W 76/19 370/336 |
| 2013/0148490 A1* | 6/2013 | Yi | ...... | H04W 12/106 370/216 |
| 2013/0343345 A1* | 12/2013 | Dinan | ...... | H04W 36/0085 370/332 |
| 2014/0036798 A1* | 2/2014 | Kanamarlapudi | ...... | H04W 72/0406 370/329 |
| 2014/0254393 A1* | 9/2014 | Yi | ...... | H04W 72/0413 370/242 |
| 2015/0092541 A1* | 4/2015 | Yang | ...... | H04W 52/0216 370/230 |
| 2015/0110048 A1* | 4/2015 | Damnjanovic | ...... | H04W 76/16 370/329 |
| 2015/0143463 A1* | 5/2015 | Baghel | ...... | H04L 63/20 726/3 |
| 2015/0304891 A1* | 10/2015 | Dinan | ...... | H04W 72/0413 370/331 |
| 2016/0227434 A1* | 8/2016 | Grinshpun | ...... | H04W 28/0284 |
| 2016/0278138 A1* | 9/2016 | Chen | ...... | H04W 36/0027 |
| 2017/0041767 A1* | 2/2017 | Vajapeyam | ...... | H04W 4/06 |
| 2017/0111832 A1* | 4/2017 | Wen | ...... | H04W 76/16 |
| 2018/0013685 A1* | 1/2018 | Yu | ...... | H04W 12/037 |
| 2018/0014224 A1* | 1/2018 | Cheng | ...... | H04L 47/2425 |
| 2018/0083688 A1* | 3/2018 | Agiwal | ...... | H04W 12/033 |
| 2018/0092146 A1* | 3/2018 | Hong | ...... | H04W 36/0055 |

FOREIGN PATENT DOCUMENTS

| | | |
|---|---|---|
| CN | 105637965 A | 6/2016 |
| EP | 3070975 A1 | 9/2016 |
| WO | 2015/145255 A2 | 10/2015 |
| WO | 2016/159634 A1 | 10/2016 |

OTHER PUBLICATIONS

Huawei et al., "Outer header for Uu adaptation layer", 3GPP TSG-RAN WG2 #97, R2-1701134, Feb. 13-17, 2017, total 5 pages, Athens,Greece.

Huawei et al., "WD and bearer identification in adaptation layer", 3GPP TSG-RAN WG2 #96, R2-167882, Nov. 14-18, 2016, total 5 pages, Reno, Nevada, USA.

* cited by examiner

DATA PROCESSING METHOD, TERMINAL DEVICE, AND BASE STATION

CROSS-REFERENCE TO RELATED APPLICATIONS

This application is a national stage of International Application No. PCT/CN2017/078199, filed on Mar. 24, 2017, which claims priority to Chinese Patent Application No. 201710147480.8, filed on Mar. 13, 2017. Both of the aforementioned applications are hereby incorporated by reference in their entireties.

FIELD

This application relates to the field of wireless communications technologies, and in particular, to a data processing method, a terminal device, and a base station.

BACKGROUND

User equipment may be directly connected to a base station and directly communicate with the base station, or may be connected to a base station by using relay UE (Relay UE, also referred to as UE-to-Network Relay) and perform data communication. User equipment that performs data communication with a base station by using relay UE is referred to as remote user equipment (Remote UE).

In LTE Rel-15, data forwarding above an RLC layer and below a PDCP layer of Relay UE is being researched. This data forwarding mode may be referred to as Layer 2 UE-to-NW Relay. In this case, the Remote UE may be referred to as eRemote UE, or may be referred to as Evolved Remote UE; and the Relay UE may be referred to as eRelay UE, or may be referred to as Evolved Relay UE or Evolved UE-to-NW Relay.

The eRelay UE forwards data of the eRemote UE by using a data radio bearer (DRB) and a signaling radio bearer (SRB). There are the following several possibilities:

Manner 1: A radio bearer of the eRelay UE is reused for transmission as a radio bearer of the eRemote UE, where the radio bearer of the eRelay UE that is used to transmit both data/signaling of the eRelay UE and data/signaling of at least one eRemote UE is referred to as a first-type radio bearer.

Manner 2: The eRelay UE specially establishes a radio bearer for transmission as a radio bearer of the eRemote UE, where the radio bearer of the eRelay UE that is only used to transmit data/signaling of at least one eRemote UE is referred to as a second-type radio bearer.

In addition to the foregoing two types of radio bearers, the eRelay UE further has another radio bearer, that is, a radio bearer only used to transmit data/signaling of the eRelay UE, and this radio bearer is referred to as a third-type radio bearer.

A radio bearer of the eRelay UE may be changed between the first-type radio bearer and the third-type radio bearer in some cases.

For example, after the eRemote UE establishes a connection to the base station by using the eRelay UE, the base station may configure the eRemote UE to reuse a currently existing data radio bearer of the eRelay UE. In this case, a type of the data radio bearer may be changed from the third type to the first type. After the eRemote UE leaves the eRelay UE due to moving, the first-type data radio bearer that is previously reused by the eRemote UE and the eRelay UE does not need to transmit data of the eRemote UE any longer. In this case, the type of the data radio bearer may be changed from the first type to the third type.

When the type of the radio bearer is changed between the first type and the third type, a packet generated based on a corresponding protocol stack of the radio bearer of the original type may be buffered at a MAC layer and an RLC layer corresponding to the radio bearer. After the type is changed, a format of a packet generated by a protocol stack of the radio bearer of the new type is different from a format of a packet generated by the protocol stack of the radio bearer of the original type. Therefore, when a receive end receives the buffered packet corresponding to the original radio bearer type, if the packet is parsed based on the packet format corresponding to the new radio bearer type, the incorrectly parsed packet is delivered to an upper layer of the protocol stack, for example, an IP layer, and finally a packet loss is caused.

Therefore, when the type of the radio bearer is changed between the first type and the third type, a technical problem about how to avoid a packet loss is desired to be resolved.

SUMMARY

Embodiments described herein provide a data processing method, a terminal device, and a base station, to resolve a technical problem about how to avoid a packet loss when a type of a radio bearer is changed between a first type and a third type in the prior art.

According to a first aspect, an embodiment provides a data processing method, including:

determining, by a terminal device, to change a type of at least one radio bearer of the terminal device from a first type to a second type;

discarding, by the terminal device, a radio link control protocol RLC protocol data unit and/or an RLC service data unit buffered by a transmit side of an RLC layer entity of the at least one radio bearer; and assembling, by the terminal device, an RLC protocol data unit received by a receive side of the RLC layer entity of the at least one radio bearer into an RLC service data unit, and delivering the RLC service data unit in sequence to an upper layer entity of the RLC layer entity, where the upper layer entity is an upper layer entity of the RLC layer entity before the type of the at least one radio bearer is changed.

For the transmit side of the RLC layer entity of the at least one radio bearer of the terminal device, when the type of the at least one radio bearer of the terminal device is changed, uplink data buffered by the transmit side of the RLC layer entity further includes packets that have not been transmitted to a MAC layer entity, and if the packets are transmitted to a base station after the type change, a packet loss is caused by depacketization failure on a base station side. Therefore, in the foregoing embodiment, the data buffered by the transmit side of the RLC layer entity of the radio bearer is discarded. In this way, if the base station does not receive the packets, the base station further transmits a PDCP status report of the at least one radio bearer to the terminal device, instructing the terminal device to retransmit the packets, and therefore the packet loss caused by depacketization failure is avoided. In addition, because the packets that may cause depacketization failure are discarded, resource waste caused by transmission of invalid packets is avoided, and desired air interface resources can be saved.

For the receive side of the RLC layer entity of the at least one radio bearer of the terminal device, when the type of the at least one radio bearer of the terminal device is changed, downlink data received by the receive side of the RLC layer entity includes packets that have been received before the type change but have not been delivered to the upper layer entity (the upper layer entity before the type change), and the packets have been transmitted successfully. In the foregoing embodiment, to avoid air interface resource waste caused by retransmission, when the type is changed, the data is delivered to the upper layer entity before the type change. This ensures that the packets can be depacketized correctly, and avoids depacketization failure caused by delivering, after the type is changed, the packets to the upper layer entity after the type change.

In a possible implementation, the method further includes:

stopping and resetting, by the terminal device, all timers of the RLC layer entity of the at least one radio bearer; and resetting, by the terminal device, all state variables of the RLC layer entity of the at least one radio bearer to initial values.

When the type of the at least one radio bearer is the first type, the upper layer entity of the RLC layer entity is a packet data convergence protocol PDCP layer entity, or when the type of the at least one radio bearer is the second type, the upper layer entity of the RLC layer entity is an adaptation protocol layer entity; or when the type of the at least one radio bearer is the first type, the upper layer entity of the RLC layer entity is an adaptation protocol layer entity, or when the type of the at least one radio bearer is the second type, the upper layer entity of the RLC layer entity is the PDCP layer entity.

In a possible implementation, if the at least one radio bearer is a data radio bearer in RLC acknowledged mode or a signaling radio bearer in RLC acknowledged mode, the method further includes:

retransmitting, by the terminal device, a PDCP protocol data unit that is not successfully transmitted by the PDCP layer entity of the at least one radio bearer, where the PDCP protocol data unit is a PDCP protocol data unit that is delivered to a lower layer entity before the type of the at least one radio bearer is changed but successful reception of which is not fed back or acknowledged by the lower layer entity, and the lower layer entity is a lower layer entity of the PDCP layer entity before the type of the at least one radio bearer is changed; and generating and transmitting, by the terminal device, a PDCP status report, where the PDCP status report is used to notify a base station of a sequence number of a PDCP service data unit that is not successfully received.

In the foregoing embodiment, for a transmit side of the PDCP layer entity of the at least one radio bearer of the terminal device, when the type of the at least one radio bearer of the terminal device is changed, to adapt to a scenario in which the at least one radio bearer transmits downlink data in RLC acknowledged mode, if an uplink PDCP PDU is transmitted before the type change but no acknowledgement about successful reception thereof is received, the PDCP entity retransmits the packet. Therefore, it can be ensured that the packet is not lost.

In a possible implementation, if the at least one radio bearer is a signaling radio bearer in RLC acknowledged mode, the method further includes:

resetting, by the terminal device, a value of a variable used to record a sequence number of a next transmitted PDCP service data unit and a value of a hyper frame number in the PDCP entity of the at least one radio bearer to 0; and resetting, by the terminal device, a value of a variable used to record a sequence number of a next received PDCP service data unit and a value of a hyper frame number in the PDCP entity of the at least one radio bearer to 0.

In a possible implementation, the method further includes:

resetting, by the terminal device, a media access control MAC layer entity.

In a possible implementation, the method further includes at least one of the following features:

clearing, by the terminal device, buffers of all uplink HARQ processes of a media access control MAC layer entity;

setting, by the terminal device, new data indication information of all uplink HARQ processes to 0;

clearing, by the terminal device, buffers of all downlink HARQ processes of a media access control MAC layer entity; and for each downlink HARQ process, considering, by the terminal device, a transport block subsequently received in the downlink HARQ process as first transmission of the transport block.

In a possible implementation, the method further includes:

receiving, by a media access control MAC layer entity of the terminal device, a MAC protocol data unit after the type of the at least one radio bearer is changed; and if the MAC protocol data unit is initially received before the type of the at least one radio bearer is changed, and the MAC protocol data unit includes a MAC service data unit of the at least one radio bearer, discarding the MAC service data unit of the at least one radio bearer.

For a transmit side of the MAC layer entity of the terminal device, when the type of the at least one radio bearer of the terminal device is changed, and when an uplink HARQ process on the transmit side of the MAC layer entity includes MAC SDUs corresponding to a logical channel of the at least one radio bearer of the terminal device, if the MAC SDUs are packets that are not successfully transmitted, and the packets are transmitted to the base station after the type change, a packet loss is caused by depacketization failure on the base station side. Therefore, in the foregoing embodiment, the MAC layer entity is reset, or a buffer of the uplink HARQ process on the transmit side of the MAC layer entity is cleared. In this way, if the base station has not received the packets, the base station further transmits a PDCP status report of the at least one radio bearer to the terminal device, instructing the terminal device to retransmit the packets, and therefore the packet loss caused by depacketization failure is avoided. In addition, because the packets that may cause depacketization failure are discarded, resource waste caused by transmission of invalid packets is avoided, and desired air interface resources can be saved.

For a receive side of the MAC layer entity of the terminal device, when the type of the at least one radio bearer of the terminal device is changed, if a buffer of a downlink HARQ process on the receive side of the MAC layer entity includes a MAC PDU of the terminal device waiting for HARQ retransmission, and the MAC PDU includes MAC SDUs of the at least one radio bearer, when the MAC SDUs are delivered to an upper layer entity of the MAC layer entity after the type change, a packet loss is caused by depacketization failure on the upper layer entity. Therefore, in the foregoing embodiment, the MAC layer entity is reset, or the buffer of the downlink HARQ process on the receive side of the MAC layer entity is cleared, or MAC SDUs buffered in the downlink HARQ process on the receive side of the MAC layer entity and corresponding to the logical channel of the at least one radio bearer before the type change are discarded. In this way, if the terminal device has not received the packets, the terminal device further transmits a PDCP status report of the at least one radio bearer of the terminal device to the base station, instructing the base station to retransmit the packets, and therefore the packet loss caused by depacketization failure on the terminal device is avoided. In addition, because the packets that may cause depacketization failure are discarded, resource waste caused by transmission of invalid packets is avoided, and desired air interface resources can be saved.

According to a second aspect, an embodiment provides a data processing method, including:

determining, by a first device, to change a type of at least one radio bearer of the first device from a first type to a second type; and receiving, by the first device, first indication information transmitted by a second device, where the first indication information is used to indicate that a radio bearer type of data that is of the at least one radio bearer and is received by the first device is a first-type radio bearer or a second-type radio bearer; where the first device is a terminal device, and the second device is a base station; or the first device is a base station, and the second device is a terminal device.

In this embodiment, the first indication information may be used to notify a receiving device of which packets processed at an RLC layer of the receiving device need to be delivered to a PDCP layer of the receiving device, and which packets processed at the RLC layer of the receiving device need to be delivered to a protocol adaptation layer of the receiving device. This ensures that the packets can be correctly depacketized, and avoids depacketization failure caused by the type change.

In a possible implementation, the first indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Further, the method includes:

receiving, by the first device, an RLC protocol data unit of the at least one radio bearer;

determining, by the first device based on the first indication information and a sequence number of the received RLC protocol data unit of the at least one radio bearer, that a radio bearer type of the received RLC protocol data unit of the at least one radio bearer is the first-type radio bearer or the second-type radio bearer; and determining, by the first device based on the radio bearer type of the received RLC protocol data unit of the at least one radio bearer, an upper layer entity for the received RLC protocol data unit of the at least one radio bearer, where the upper layer entity is an upper layer entity of an RLC protocol layer of the at least one radio bearer before the type of the at least one radio bearer is changed or after the type of the at least one radio bearer is changed.

Further, the obtaining, by the first device, of first indication information includes:

receiving, by the first device, an RRC connection reconfiguration message that is of the at least one radio bearer and is transmitted by the second device, where the RRC connection reconfiguration message includes the first indication information; or receiving, by the first device, an RLC control protocol data unit that is of the at least one radio bearer and is transmitted by the second device, where the RLC control protocol data unit includes the first indication information.

In a possible implementation, the obtaining, by the first device, of first indication information includes:

receiving, by the first device, a MAC protocol data unit transmitted by the second device, where the MAC protocol data unit includes a MAC service data unit of the at least one radio bearer, and a MAC subheader corresponding to the MAC service data unit carries the first indication information.

In a possible implementation, the method further includes:

transmitting, by the first device, second indication information to the second device, where the second indication information is used to notify that a radio bearer type of data that is of the at least one radio bearer and is received by the second device is the first-type radio bearer or the second-type radio bearer.

In a possible implementation, the second indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Further, the transmitting, by the first device, of second indication information to the second device includes:

transmitting, by the first device, an RRC connection reconfiguration complete message of the at least one radio bearer to the second device, where the RRC connection reconfiguration complete message includes the second indication information; or transmitting, by the first device, an RLC control protocol data unit of the at least one radio bearer to the second device, where the RLC control protocol data unit includes the second indication information.

In a possible implementation, the transmitting, by the first device, of second indication information to the second device includes:

transmitting, by the first device, a MAC protocol data unit to the second device, where the MAC protocol data unit includes a MAC service data unit of the at least one radio bearer, and a MAC subheader corresponding to the MAC service data unit carries the second indication information.

According to a third aspect, this embodiment provides a data processing method, including:

receiving, by a terminal device, first configuration information transmitted by a base station, where the first configuration information is used to configure at least one radio bearer of the terminal device to change from a first-type radio bearer to a second-type radio bearer; and determining, based on the first configuration information, to change a type of the at least one radio bearer from the first-type radio bearer to the second-type radio bearer.

In a possible implementation, the determining, by the terminal device based on the first configuration information, to change a type of the at least one radio bearer from the first-type radio bearer to the second-type radio bearer includes:

when the terminal device determines, based on an identifier of the at least one radio bearer that is carried in the first configuration information, that the at least one radio bearer is the currently configured radio bearer, and determines that the type of the at least one radio bearer is the first-type radio bearer, if the first configuration information includes third indication information, determining to change the type of the at least one radio bearer from the first-type radio bearer to the second-type radio bearer, where the first-type radio bearer includes a packet data convergence protocol PDCP layer entity, a radio link control protocol RLC layer entity, and a logical channel; the second-type radio bearer includes a PDCP layer entity, the adaptation protocol layer entity, an RLC layer entity, and a logical channel; and the third indication information is used to indicate that the type of the radio bearer configured by the terminal device is the second-type radio bearer.

In this embodiment, the terminal device may determine, based on the first configuration information, to change the at least one radio bearer of the terminal device from a third-type radio bearer to the first-type radio bearer.

In a possible implementation, the determining, by the terminal device based on the first configuration information, to change a type of the at least one radio bearer from the first-type radio bearer to the second-type radio bearer includes:

when the terminal device determines, based on an identifier of the at least one radio bearer that is carried in the first configuration information, that the at least one radio bearer is the currently configured radio bearer, and determines that the type of the at least one radio bearer is the first-type radio bearer, if the first configuration information does not include fifth indication information, determining to change the type of the at least one radio bearer from the first-type radio bearer to the second-type radio bearer, where the first-type radio bearer includes a PDCP layer entity, the adaptation protocol layer entity, an RLC layer entity, and a logical channel; the second-type radio bearer includes a packet data convergence protocol PDCP layer entity, a radio link control protocol RLC layer entity, and a logical channel; and the fifth indication information is used to indicate that the type of the radio bearer configured by the terminal device is the first-type radio bearer. In this embodiment, the terminal device may determine, based on the first configuration information, to change the at least one radio bearer of the terminal device from the first-type radio bearer to a third-type radio bearer.

According to a fourth aspect, an embodiment provides a data processing method, including:

transmitting, by a base station, first configuration information to a terminal device, where the first configuration information is used to configure at least one radio bearer of the terminal device to change from a first-type radio bearer to a second-type radio bearer.

In a possible implementation, if the first-type radio bearer includes a packet data convergence protocol PDCP layer entity, a radio link control protocol RLC layer entity, and a logical channel, and the second-type radio bearer includes a PDCP layer entity, the adaptation protocol layer entity, an RLC layer entity, and a logical channel, the first configuration information includes an identifier of the at least one radio bearer and further includes third indication information, where the third indication information is used to indicate that a type of the radio bearer configured by the terminal device is the second-type radio bearer. In this embodiment, the base station may configure the at least one radio bearer of the terminal device to change from a third-type radio bearer to the first-type radio bearer.

In a possible implementation, if the first-type radio bearer includes a PDCP layer entity, the adaptation protocol layer entity, an RLC layer entity, and a logical channel, and the second-type radio bearer includes a packet data convergence protocol PDCP layer entity, a radio link control protocol RLC layer entity, and a logical channel, the first configuration information includes an identifier of the at least one radio bearer but does not include fifth indication information, where the fifth indication information is used to indicate that a type of the radio bearer configured by the terminal device is the first-type radio bearer. In this embodiment, the base station may configure the at least one radio bearer of the terminal device to change from the first-type radio bearer to a third-type radio bearer.

According to a fifth aspect, an embodiment provides a terminal device, where the terminal device includes a memory, a transceiver, and a processor, where the memory is configured to store an instruction; and the processor is configured to execute the instruction stored in the memory, and control the transceiver to receive a signal and transmit a signal, so that when the processor executes the instruction stored in the memory, the terminal device is configured to perform the method in the first aspect or any possible implementation of the first aspect.

According to a sixth aspect, an embodiment provides a terminal device, where the terminal device includes a memory, a transceiver, and a processor, where the memory is configured to store an instruction; and the processor is configured to execute the instruction stored in the memory, and control the transceiver to receive a signal and transmit a signal, so that when the processor executes the instruction stored in the memory, the terminal device is configured to perform steps related to the terminal in the second aspect or any possible implementation of the second aspect.

According to a seventh aspect, an embodiment provides a base station, where the base station includes a memory, a transceiver, and a processor, where the memory is configured to store an instruction; and the processor is configured to execute the instruction stored in the memory, and control the transceiver to receive a signal and transmit a signal, so that when the processor executes the instruction stored in the memory, the base station is configured to perform steps related to the base station in the second aspect or any possible implementation of the second aspect.

According to an eighth aspect, an embodiment provides a terminal device, where the terminal device includes a memory, a transceiver, and a processor, where the memory is configured to store an instruction; and the processor is configured to execute the instruction stored in the memory, and control the transceiver to receive a signal and transmit a signal, so that when the processor executes the instruction stored in the memory, the terminal device is configured to perform the method in the third aspect or any possible implementation of the third aspect.

According to a ninth aspect, an embodiment provides a base station, where the base station includes a memory, a transceiver, and a processor, where the memory is configured to store an instruction; and the processor is configured to execute the instruction stored in the memory, and control the transceiver to receive a signal and transmit a signal, so that when the processor executes the instruction stored in the memory, the base station is configured to perform the method in the fourth aspect or any possible implementation of the fourth aspect.

According to a tenth aspect, an embodiment provides a computer-readable storage medium, where the computer-readable storage medium stores an instruction, so that when the instruction runs on a computer, the computer performs the method in the first aspect or any possible implementation of the first aspect.

According to an eleventh aspect, an embodiment provides a computer program product including an instruction, so that when the computer program product runs on a computer, the computer performs the method in the first aspect or any possible implementation of the first aspect.

According to a twelfth aspect, an embodiment provides a computer-readable storage medium, where the computer-readable storage medium stores an instruction, so that when the instruction runs on a computer, the computer performs the method in the second aspect or any possible implementation of the second aspect.

According to a thirteenth aspect, an embodiment provides a computer program product including an instruction, so that when the computer program product runs on a computer, the computer performs the method in the second aspect or any possible implementation of the second aspect.

According to a fourteenth aspect, an embodiment provides a computer-readable storage medium, where the computer-readable storage medium stores an instruction, so that when the instruction runs on a computer, the computer performs the method in the third aspect or any possible implementation of the third aspect.

According to a fifteenth aspect, an embodiment provides a computer program product including an instruction, so that when the computer program product runs on a computer, the computer performs the method in the third aspect or any possible implementation of the third aspect.

According to a sixteenth aspect, an embodiment provides a computer-readable storage medium, where the computer-readable storage medium stores an instruction, so that when the instruction runs on a computer, the computer performs the method in the fourth aspect or any possible implementation of the fourth aspect.

According to a seventeenth aspect, an embodiment provides a computer program product including an instruction, so that when the computer program product runs on a computer, the computer performs the method in the fourth aspect or any possible implementation of the fourth aspect.

DETAILED DESCRIPTION OF EMBODIMENTS

The following further describes in detail the embodiments with reference to accompanying drawings.

The following describes a running environment of a system. The technology described herein is applicable to an LTE system, for example, an LTE/LTE-A/eLTE system, or other wireless communications systems using various radio access technologies, for example, a system using an access technology such as code division multiple access (CDMA), frequency division multiple access (FDMA), time division multiple access (TDMA), orthogonal frequency division multiple access (OFDMA), or single carrier-frequency division multiple access (SC-FDMA), or applicable to a future evolved system, such as 5th Generation 5 G (which may also be referred to as new radio (NR)), or may be extended to similar wireless communications systems, such as Wi-Fi, WiMAX, and 3GPP-related cellular systems.

Figure 1:
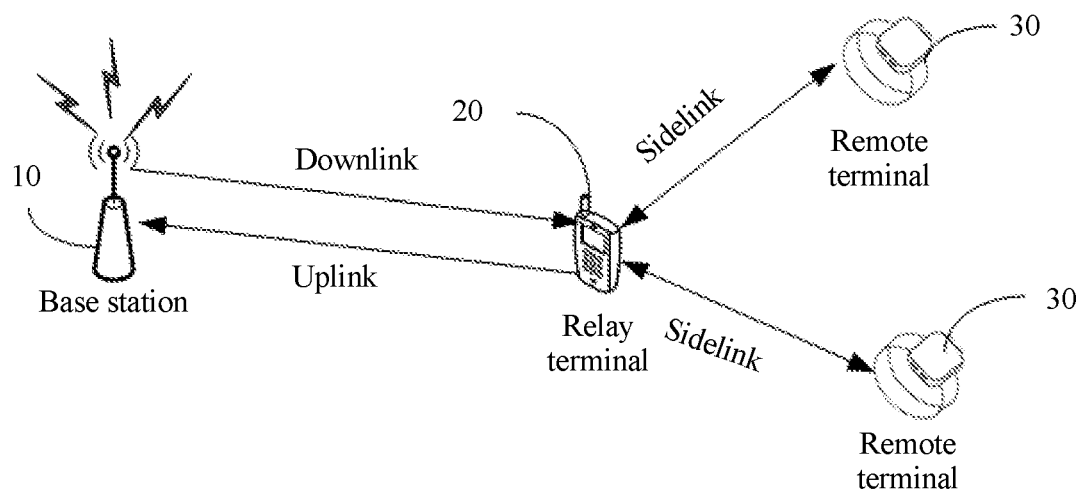
FIG. 1 is a schematic diagram of a system architecture according to an embodiment.
Figure 2A:
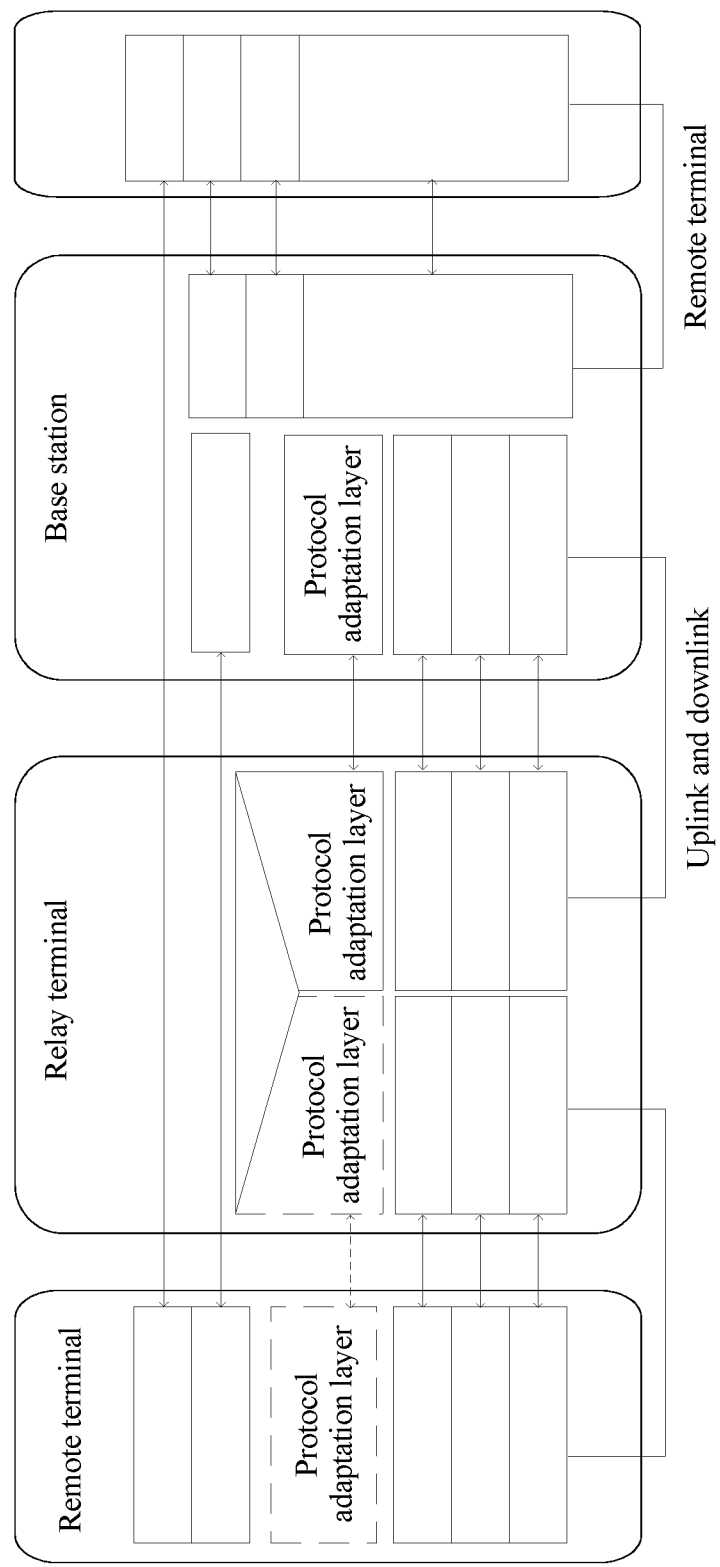
FIG. 2(a) is a schematic diagram of a user plane protocol stack and a control plane protocol stack in a system architecture according to an embodiment.
Figure 2B:
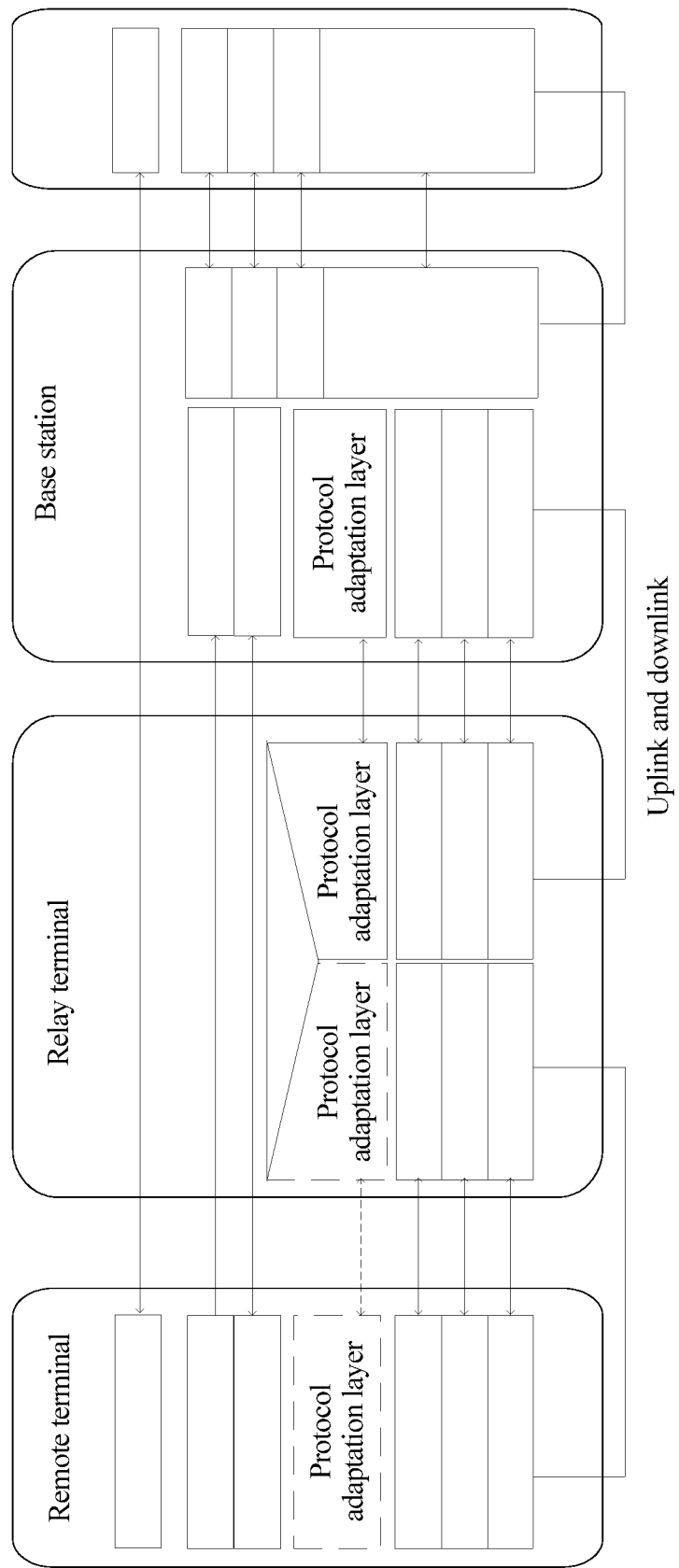
FIG. 2(b) is a schematic diagram of a user plane protocol stack and a control plane protocol stack in a system architecture according to an embodiment
Figure 2C:
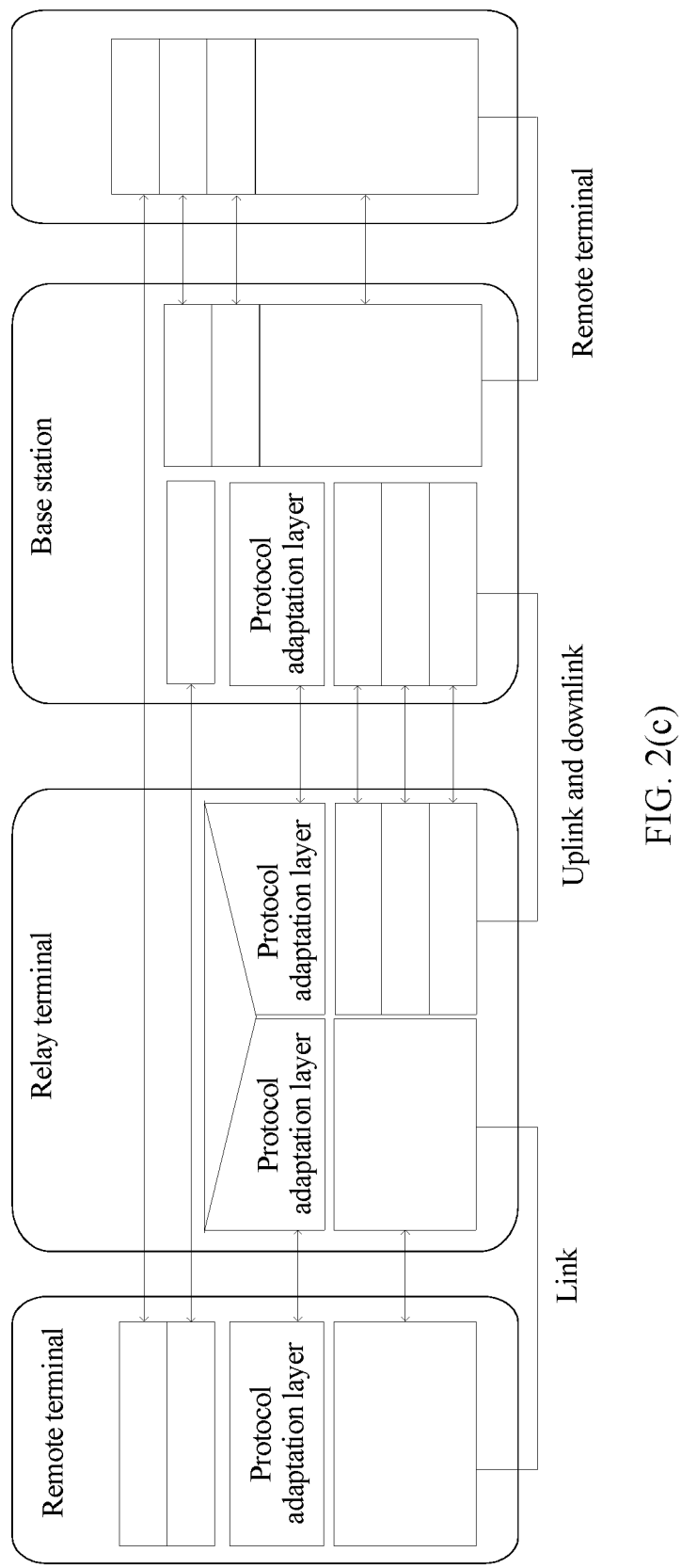
FIG. 2(c) is a schematic diagram of a user plane protocol stack and a control plane protocol stack in a system architecture according to an embodiment
Figure 2D:
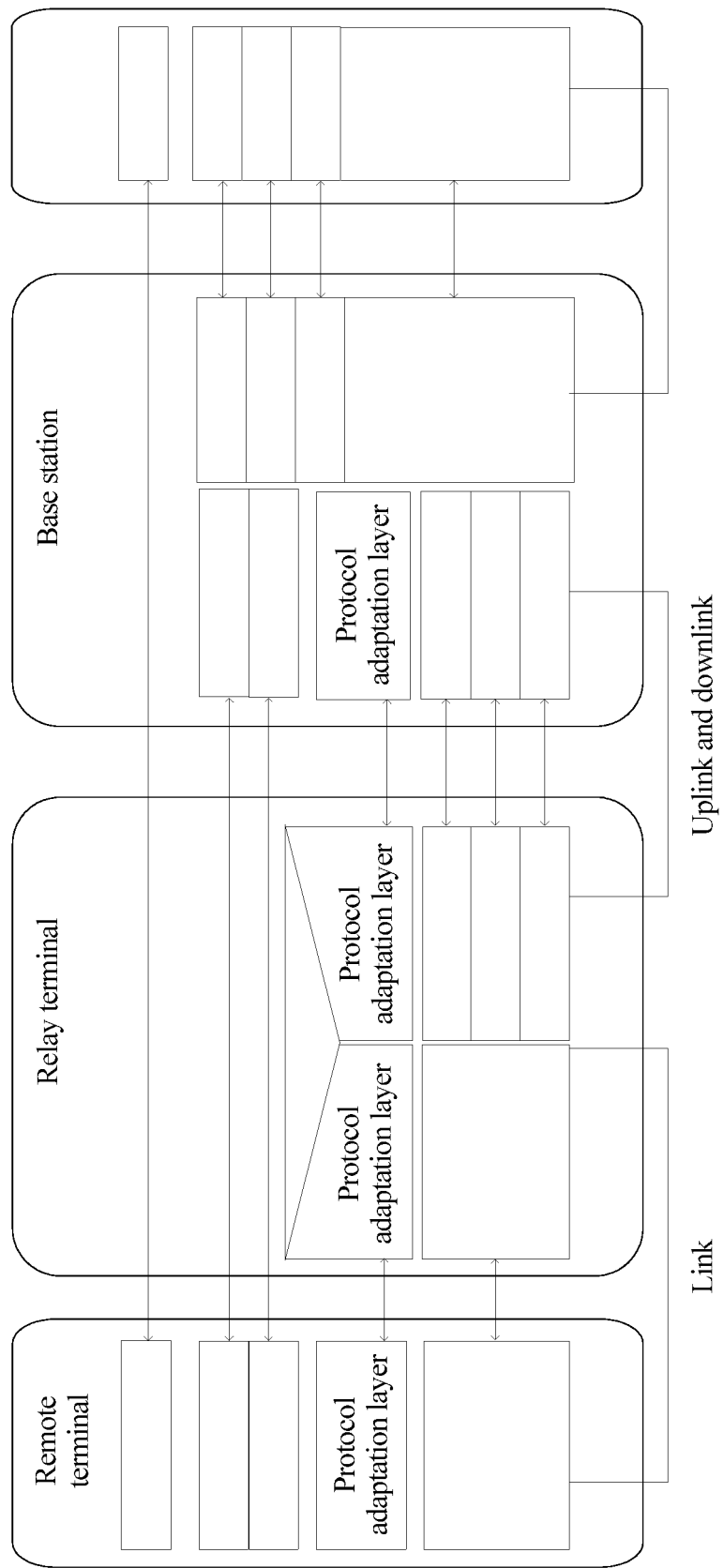
FIG. 2(d) is a schematic diagram of a user plane protocol stack and a control plane protocol stack in a system architecture according to an embodiment

FIG. 1 is a basic architecture of a communications system according to an embodiment, where the communications system includes a relay terminal 20, a remote terminal 30, and a base station 10. Data or signaling transmission, including uplink transmission and downlink transmission, may be performed between the base station 10 and the relay terminal 20 by using a radio interface. A connection between the relay terminal 20 and the base station 10 includes an uplink and a downlink. The remote terminal 30 is connected to and performs data or signaling transmission with the base station 10 by using the relay terminal 20, and the connection between the relay terminal 20 and the remote terminal 30 is a sidelink.

In LTE Rel-15, the relay terminal 20 performs data forwarding above an RLC layer entity of the relay terminal 20 and below a PDCP layer entity of the relay terminal 20, and this data forwarding mode may be referred to as Layer 2 UE-to-NW Relay. In this case, the remote terminal 30 may be referred to as eRemote UE, or may be referred to as Evolved Remote UE; and the relay terminal 20 may be referred to as eRelay UE, or may be referred to as Evolved Relay UE or Evolved UE-to-NW Relay.

In this system architecture, when the remote terminal 30 establishes a connection to and performs data transmission with a network side by using the relay terminal 20, the connection between the remote terminal 30 and the relay terminal 20 is established by using a sidelink technology or a PC5 interface. For user plane protocol stacks of the remote terminal 30, the relay terminal 20, the base station (eNB) 10, and a core network (CN), refer to FIG. 2(*a*). For control plane protocol stacks of the remote terminal 30, the relay terminal 20, the eNB 10, and the CN, refer to FIG. 2(*b*).

Optionally, a connection may also be established between the relay terminal 20 and the remote terminal 30 by using a non-3GPP access technology, for example, a Bluetooth access technology or a WLAN access technology.

In this case, the remote terminal 30 establishes a connection to the network side by using the relay terminal 20, and the connection between the remote terminal 30 and the relay terminal 20 is established by using the non-3GPP access technology. For user plane protocol stacks of the remote terminal 30, the relay terminal 20, eNB 10, and the CN, refer to FIG. 2(*c*). For control plane protocol stacks of the remote terminal 30, the relay terminal 20, the eNB 10, and the CN, refer to FIG. 2(*d*).

Based on the protocol stacks in FIG. 2(*a*), FIG. 2(*b*), FIG. 2(*c*), and FIG. 2(*d*), when the remote terminal 30 establishes a connection to and performs data transmission with the network side by using the relay terminal 20, if one or more radio bearers of the relay terminal 20 are first-type radio bearers, for a communications protocol stack architecture between the relay terminal 20 and the eNB 10, refer to FIG. 3(*a*). As can be seen from FIG. 3(*a*), one or more radio bearers of the relay terminal 20 include a PDCP layer, a protocol adaptation layer, an RLC layer, and a logical channel, and the protocol adaptation layer is added between the PDCP layer and the RLC layer of the relay terminal 20. Corresponding to the one or more radio bearers of the relay terminal 20, protocol layer entities of the base station 10 include a PDCP layer, a protocol adaptation layer, an RLC layer, and a logical channel, and the protocol adaptation layer is added between the PDCP layer and the RLC layer.

If one or more radio bearers of the relay terminal 20 are second-type radio bearers, for a communications protocol stack architecture between the relay terminal 20 and the eNB 10, refer to FIG. 3(*b*). As can be seen from FIG. 3(*b*), one or more radio bearers of the relay terminal 20 include a protocol adaptation layer, an RLC layer, and a logical channel. Corresponding to the one or more radio bearers of the relay terminal 20, protocol layer entities of the base station 10 include a protocol adaptation layer and an RLC layer.

If one or more radio bearers of the relay terminal 20 are third-type radio bearers, for a communications protocol stack architecture between the relay terminal 20 and the eNB 10, refer to FIG. 3(*c*). As can be seen from FIG. 3(*c*), one or more radio bearers of the relay terminal 20 include a PDCP layer, an RLC layer, and a logical channel. Corresponding to the one or more radio bearers of the relay terminal 20, protocol layer entities of the base station 10 include a PDCP layer, an RLC layer, and a logical channel.

Based on FIG. 3(*a*) and FIG. 3(*c*), when the remote terminal 30 accesses the network side by using the relay terminal 20, if the one or more radio bearers of the relay terminal 20 are changed from third-type radio bearers to first-type radio bearers, an upper layer entity of an RLC layer entity of the one or more radio bearers of the relay terminal 20 is changed from a PDCP layer entity to an adaptation protocol layer entity, and a lower layer entity of the PDCP layer entity of the one or more radio bearers of the relay terminal 20 is changed from the RLC layer entity to the adaptation protocol layer entity. In this case, a packet format of an RLC SDU at the RLC layer of the one or more radio bearers of the relay terminal 20 is changed from a packet format of an RLC SDU of a third-type radio bearer to a packet format of an RLC SDU of a first-type radio bearer. For the packet format of the RLC SDU of the third-type radio bearer, refer to FIG. 3(*d*). For the packet format of the RLC SDU of the first-type radio bearer, refer to FIG. 3(*e*).

Based on FIG. 3(*a*) and FIG. 3(*c*), when the remote terminal 30 does not access the network side by using the relay terminal 20, if the one or more radio bearers of the relay terminal 20 are changed from first-type radio bearers to third-type radio bearers, the upper layer entity of the RLC layer entity of the one or more radio bearers of the relay terminal 20 is changed from the adaptation protocol layer entity to the PDCP layer entity, and the lower layer entity of the PDCP layer entity of the one or more radio bearers of the relay terminal 20 is changed from the adaptation protocol layer entity to the RLC layer entity. In this case, when the RLC layer entity of the one or more radio bearers of the relay terminal 20 transmits data and signaling, a packet format of the data and signaling is changed from an encapsulation format of the first-type radio bearer to an encapsulation format of the third-type radio bearer.

Based on the basic system architecture between the relay terminal 20, the remote terminal 30, and the base station 10 in the examples in FIG. 1, FIG. 2(*a*), FIG. 2(*b*), FIG. 2(*c*), FIG. 2(*d*), FIG. 3(*a*), FIG. 3(*b*), and FIG. 3(*c*), embodiments provide a data processing method, a terminal device, and a base station, to resolve an existing technical problem about how to avoid a packet loss when the type of the one or more radio bearers of the relay terminal 20 is changed between the first type and the third type in the system architecture.

It should be noted that, the terminal device in this embodiment is the relay terminal 20 in the basic system architecture.

FIG. 1, FIG. 2(*a*), FIG. 2(*b*), FIG. 2(*c*), FIG. 2(*d*), FIG. 3(*a*), FIG. 3(*b*), and FIG. 3(*c*) in this embodiment are content used merely as examples, and are not intended to be limiting.

In the following, some terms are described, to help a person or ordinary skill in the art have a better understanding.

A relationship between a user and a terminal (or UE) mentioned herein may be as follows: The user accesses a network by using the terminal (or the UE), and implements communication with a base station.

The terminal herein may be a device providing voice and/or data connectivity for the user, and may include a wireless terminal and a wired terminal. The wireless terminal may be a handheld device with a wireless connection function, or another processing device connected to a wireless modem, and may be a mobile terminal that communicates with one or more core networks by using a radio access network. For example, the wireless terminal may be a mobile phone, a computer, a tablet computer, a personal digital assistant (PDA), a mobile Internet device (MID), a wearable device, or an e-book reader. For another example, the wireless terminal may also be a portable, pocket-sized, handheld, computer built-in, or in-vehicle mobile device. For another example, the wireless terminal may be a mobile station or an access point. The UE mentioned above is one type of terminal, and is a term in an LTE system. For ease of description, the devices mentioned above are collectively referred to as terminals in subsequent descriptions.

The base station is an apparatus deployed in a radio access network (RAN) and configured to provide a wireless communication function for the terminal. The base station may include a macro base station, a micro base station, a relay station, an access point, a base station controller, a transmission and reception point (TRP), and the like in various forms. In systems using different radio access technologies, a name of the base station may vary. For example, in an LTE network, the base station is referred to as an evolved NodeB (eNB), and in a future evolved system, the base station may also be referred to as a new radio NodeB (gNB).

"A number of" means two or more.

In addition, it should be understood that, terms such as "first" and "second" in the descriptions are used only for description purposes and should not be understood as an indication or implication of relative significance or as an indication or implication of an order.

When a type of a radio bearer of a terminal device is changed between a first type and a third type, this application provides two data processing methods to resolve a technical problem about how to avoid a packet loss.

In a first data processing method, when a type of a radio bearer (including a data radio bearer (DRB) and a signaling radio bearer (SRB)) of a terminal device needs to be changed, an implementation is provided in which a transmit side and a receive side of each protocol layer entity corresponding to the radio bearer in the terminal device process a stored packet before the type of the radio bearer is changed, and packet processing methods on transmit sides and receive sides of a MAC layer, an RLC layer, and a PDCP layer corresponding to the radio bearer are included.

In a second data processing method, when a type of a radio bearer of a terminal device such as a data radio bearer or a signaling radio bearer needs to be changed, a packet stored by a transmitting device before the type of the radio bearer is changed continues to be transmitted to a receiving device after the type is changed, and the receiving device receives packets in two different encapsulation formats in a period of time. To help the receiving device decode packets in correct encapsulation formats, the transmitting device needs to notify the receiving device which packets need to be delivered to a PDCP layer of the receiving device after the packets have been processed at an RLC layer of the receiving device, and which packets need to be delivered to a protocol adaptation layer of the receiving device after the packets have been processed at the RLC layer of the receiving device. The second data processing method provides several methods for notifying, by the transmitting device, the receiving device of a radio bearer type of a received packet. In uplink data transmission, the transmitting device is a terminal device, and the receiving device is a base station. In downlink data transmission, the transmitting device is a base station, and the receiving device is a terminal.

For a terminal device that serves as relay UE, both the two data processing methods can avoid a packet loss of the relay UE caused in a transmission process at an access stratum when a type of a radio bearer of the relay UE is changed, and can further reduce resource waste caused by transmission of an invalid packet after the type of the radio bearer of the relay UE is changed.

With reference to an accompanying figure, the following embodiment describes the first data processing method.

Figure 4:
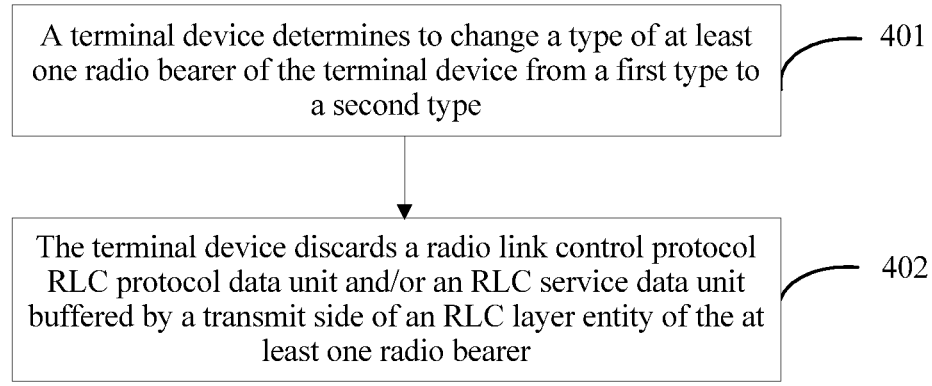
FIG. 4 is a method flowchart of a data processing method according to an embodiment.

As shown in FIG. 4, a data processing method provided by an embodiment includes the following steps.

In step 401: a terminal device determines to change a type of at least one radio bearer of the terminal device from a first type to a second type.

In step 402: the terminal device discards a radio link control protocol RLC protocol data unit and/or an RLC service data unit buffered by a transmit side of an RLC layer entity (or a transmit side entity of an RLC layer) of the at least one radio bearer; and the terminal device assembles an RLC protocol data unit received by a receive side of the RLC layer entity (or a receiving entity of the RLC layer) of the at least one radio bearer into an RLC service data unit, and delivers the RLC service data unit in sequence to an upper layer entity of the RLC layer entity, where the upper layer entity is an upper layer entity of the RLC layer entity before the type of the at least one radio bearer is changed.

It can be noted that, in step 401, that the type of the at least one radio bearer of the terminal device is changed from the first type to the second type includes that the at least one radio bearer of the terminal device may be changed from a third-type radio bearer to a first-type radio bearer or may be changed from a first-type radio bearer to a third-type radio bearer.

When the at least one radio bearer of the terminal device is the first-type radio bearer, entities corresponding to the radio bearer include a PDCP layer entity, an adaptation protocol layer entity, an RLC layer entity, and a logical channel. When the at least one radio bearer of the terminal device is the third-type radio bearer, entities corresponding to the radio bearer include a PDCP layer entity, an RLC layer entity, and a logical channel.

Therefore, when the at least one radio bearer of the terminal device is changed from the first-type radio bearer to the third-type radio bearer, the upper layer entity of the RLC layer entity is changed from the adaptation protocol layer entity to the PDCP layer entity, and a lower layer entity of the PDCP layer entity is changed from the adaptation protocol layer entity to the RLC layer entity.

When the at least one radio bearer of the terminal device is changed from the third-type radio bearer to the first-type radio bearer, the upper layer entity of the RLC layer entity is changed from the PDCP layer entity to the adaptation protocol layer entity, and the lower layer entity of the PDCP layer entity is changed from the RLC layer entity to the adaptation protocol layer entity.

It can be noted that, a data radio bearer of the terminal device may transmit data in RLC unacknowledged mode (UM), or transmit data in RLC acknowledged mode (AM), and a signaling radio bearer of the terminal device transmits data in RLC AM mode. Therefore, to adapt to a case in which the at least one radio bearer is a signaling radio bearer or a data radio bearer in RLC AM mode, the RLC protocol data unit (PDU) and the RLC service data unit (SDU) buffered by the transmit side of the RLC layer entity of the at least one radio bearer of the terminal device are discarded in step 402; or to adapt to a case in which the at least one radio bearer is a data radio bearer in RLC UM mode, the RLC SDU buffered by the transmit side of the RLC layer entity of the at least one radio bearer of the terminal device is discarded in step 402.

For the transmit side of the RLC layer entity of the at least one radio bearer of the terminal device, when the type of the at least one radio bearer of the terminal device is changed, uplink data buffered by the transmit side of the RLC layer entity further includes packets that have not been transmitted to a MAC layer entity, and if the packets are transmitted to a base station after the type change, a packet loss is caused by depacketization failure on a base station side. Therefore, in the foregoing embodiment, the data buffered by the transmit side of the RLC layer entity of the radio bearer is discarded. In this way, if the base station does not receive the packets, the base station further transmits a PDCP status report of the at least one radio bearer to the terminal device, instructing the terminal device to retransmit the packets, and therefore the packet loss caused by depacketization failure is avoided. In addition, because the packets that may cause depacketization failure are discarded, resource waste caused by transmission of invalid packets is avoided, and desired air interface resources can be saved.

For the receive side of the RLC layer entity of the at least one radio bearer of the terminal device, when the type of the at least one radio bearer of the terminal device is changed, downlink data received by the receive side of the RLC layer entity includes packets that have been received before the type change but have not been delivered to the upper layer entity (the upper layer entity before the type change), and the packets have been transmitted successfully. In the foregoing embodiment, to avoid air interface resource waste caused by retransmission, when the type is changed, the data is delivered to the upper layer entity before the type change. This ensures that the packets can be depacketized correctly, and avoids depacketization failure caused by delivering, after the type is changed, the packets to the upper layer entity after the type change.

Optionally, after step 401, the method further includes:

the terminal device stops and resets all timers of the RLC layer entity of the at least one radio bearer; and the terminal device resets all state variables of the RLC layer entity of the at least one radio bearer to initial values.

Optionally, if the at least one radio bearer is a data radio bearer in RLC acknowledged mode or a signaling radio bearer in RLC acknowledged mode, the method further includes:

the terminal device retransmits a PDCP protocol data unit that is not successfully transmitted by the PDCP layer entity of the at least one radio bearer, where the PDCP protocol data unit is a PDCP protocol data unit that is delivered to a lower layer entity before the type of the at least one radio bearer is changed but successful reception of which is not fed back or acknowledged by the lower layer entity, and the lower layer entity is a lower layer entity of the PDCP layer entity before the type of the at least one radio bearer is changed; and the terminal device receives a PDCP protocol data unit delivered by the lower layer entity.

Further, the method may further include: for downlink data transmission, the terminal device generates a PDCP status report of the at least one radio bearer, and transmits the PDCP status report to the base station, where the PDCP status report is used to notify the base station of a sequence number of a PDCP service data unit of the at least one radio bearer that is not successfully received. Optionally, the terminal may determine, based on an indication of the base station, whether the PDCP status report needs to be transmitted for the at least one radio bearer. When the terminal receives the indication of the base station, indicating that the PDCP status report of the at least one radio bearer needs to be transmitted, the terminal transmits the PDCP status report.

In the foregoing embodiment, for a transmit side of the PDCP layer entity of the at least one radio bearer of the terminal device, when the type of the at least one radio bearer of the terminal device is changed, the type change has no impact on the PDCP layer entity, and the PDCP layer entity may process and transmit, based on an encapsulation format after the type change, uplink data that needs to be transmitted.

In the foregoing embodiment, for a receive side of the PDCP layer entity of the at least one radio bearer of the terminal device, when the type of the at least one radio bearer of the terminal device is changed, the receive side of the PDCP layer entity receives downlink packets delivered by the lower layer entity before the type change, where the packets have been transmitted successfully. To avoid air interface resource waste caused by retransmission, when the type is changed, the data is delivered to the upper layer entity before the type change. This ensures that the packets can be depacketized correctly, and avoids depacketization failure caused by delivering, after the type is changed, the packets to the upper layer entity after the type change.

Figure 17:
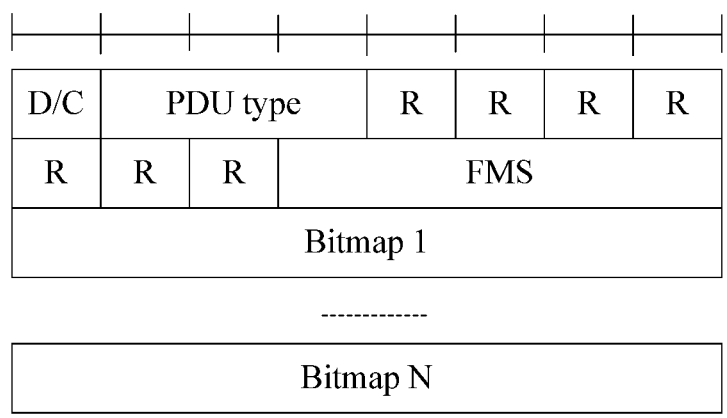
FIG. 17 is a schematic diagram of a format of a status report of an SRB according to an embodiment.

In the foregoing embodiment, for the transmit side of the PDCP layer entity of the at least one radio bearer of the terminal device, when the type of the at least one radio bearer of the terminal device is changed, to adapt to a scenario in which the at least one radio bearer transmits downlink data in RLC acknowledged mode, if an uplink PDCP PDU is transmitted before the type change but no acknowledgement about successful reception thereof is received, the PDCP entity retransmits the packet. Therefore, it can be ensured that the packet is not lost. It can be noted that, a format and content of the PDCP status report when the at least one radio bearer is a signaling radio bearer in RLC AM mode are different from those of the PDCP status report when the at least one radio bearer is a data radio bearer in RLC AM mode. For a DRB in RLC AM mode, the PDCP status report in this embodiment is a PDCP layer status report defined in the standard TS 36.323. For a format and content setting of the PDCP status report, refer to TS 36.323. For an SRB in RLC AM mode, for a format of the PDCP status report in this embodiment, refer to FIG. 17.

Optionally, if the at least one radio bearer is a signaling radio bearer in RLC acknowledged mode, the method further includes:

the terminal device resets a value of a variable used to record a sequence number of a next transmitted PDCP service data unit and a value of a hyper frame number in the PDCP entity of the at least one radio bearer to 0; and the terminal device resets a value of a variable used to record a sequence number of a next received PDCP service data unit and a value of a hyper frame number in the PDCP entity of the at least one radio bearer to 0.

Optionally, if the at least one radio bearer is a signaling radio bearer in RLC acknowledged mode, the method further includes:

for uplink data transmission, discarding all PDCP SDUs and PDCP PDUs that are stored on the transmit side of the PDCP entity of the at least one radio bearer; and for downlink data transmission, discarding all PDCP PDUs that are delivered by the RLC layer entity due to the type change of the radio bearer and received by the PDCP entity of the at least one radio bearer, and discarding all stored PDCP SDUs and PDCP PDUs.

Optionally, if the at least one radio bearer is a signaling radio bearer in RLC acknowledged mode, the method further includes:

for uplink data transmission, after the type change is completed, transmitting, to the lower layer entity according to a normal process of transmitting uplink data, a PDCP SDU and a PDCP PDU that are stored by the transmit side of the PDCP layer entity of the at least one radio bearer, that is, to the lower layer entity of the PDCP layer entity after the type of the radio bearer is changed; and for downlink data transmission, after the type change is completed, receiving a PDCP PDU according to a normal process of processing downlink data, where the PDCP PDU is a PDCP PDU that is delivered due to the type change of the radio bearer by the lower layer entity before a type of the PDCP layer entity of the at least one radio bearer is changed.

Further, after step 401, the method further includes: for the MAC layer entity of the terminal device, there are the following several optional data processing manners:

Optionally, the terminal device resets the media access control MAC layer entity.

Optionally, processing of the MAC layer entity includes at least one of the following features: the terminal device clears buffers of all uplink HARQ processes of the media access control MAC layer entity; the terminal device sets new data indication information of all uplink HARQ processes to 0; the terminal device clears buffers of all downlink HARQ processes of the media access control MAC layer entity; and for each downlink HARQ process, the terminal device considers a transport block subsequently received in the downlink HARQ process as first transmission of the transport block.

Optionally, the media access control MAC layer entity of the terminal device receives a MAC protocol data unit after the type of the at least one radio bearer is changed; and if the MAC protocol data unit is initially received before the type of the at least one radio bearer is changed, and the MAC protocol data unit includes a MAC service data unit of the at least one radio bearer, the MAC layer entity discards the MAC service data unit of the at least one radio bearer.

For a transmit side of the MAC layer entity of the terminal device, when the type of the at least one radio bearer of the terminal device is changed, and when an uplink HARQ process on the transmit side of the MAC layer entity includes MAC SDUs corresponding to the logical channel of the at least one radio bearer of the terminal device, if the MAC SDUs are packets that are not successfully transmitted, and the packets are transmitted to the base station after the type change, a packet loss is caused by depacketization failure on the base station side. Therefore, in the foregoing embodiment, the MAC layer entity is reset, or a buffer of the uplink HARQ process on the transmit side of the MAC layer entity is cleared. In this way, if the base station has not received the packets, the base station further transmits a PDCP status report of the at least one radio bearer to the terminal device, instructing the terminal device to retransmit the packets, and therefore the packet loss caused by depacketization failure is avoided. In addition, because the packets that may cause depacketization failure are discarded, resource waste caused by transmission of invalid packets is avoided, and precious air interface resources can be saved.

For a receive side of the MAC layer entity of the terminal device, when the type of the at least one radio bearer of the terminal device is changed, if a buffer of a downlink HARQ process on the receive side of the MAC layer entity includes a MAC PDU of the terminal device waiting for HARQ retransmission, and the MAC PDU includes MAC SDUs of the at least one radio bearer, when the MAC SDUs are delivered to an upper layer entity of the MAC layer entity after the type change, a packet loss is caused by depacketization failure on the upper layer entity. Therefore, in the foregoing embodiment, the MAC layer entity is reset, or the buffer of the downlink HARQ process on the receive side of the MAC layer entity is cleared, or MAC SDUs buffered in the downlink HARQ process on the receive side of the MAC layer entity and corresponding to the logical channel of the at least one radio bearer before the type change are discarded. In this way, if the terminal device has not received the packets, the terminal device further transmits a PDCP status report of the at least one radio bearer of the terminal device to the base station, instructing the base station to retransmit the packets, and therefore the packet loss caused by depacketization failure on the terminal device is avoided. In addition, because the packets that may cause depacketization failure are discarded, resource waste caused by transmission of invalid packets is avoided, and precious air interface resources can be saved.

In the first data processing method, that the type of the at least one radio bearer of the terminal device is changed from the first type to the second type includes that the type may be changed from a third-type radio bearer to a first-type radio bearer or may be changed from a first-type radio bearer to a third-type radio bearer. In addition, a data radio bearer DRB of the terminal device may transmit data in RLC UM mode or may transmit data in RLC AM mode, and a signaling radio bearer of the terminal device transmits data in RLC AM mode. Therefore, the first data processing method includes data processing methods in the following six scenarios. The six scenarios are respectively as follows:

Scenario 1: a data radio bearer transmitting data in RLC UM mode is changed from a third-type radio bearer to a first-type radio bearer.

Scenario 2: a data radio bearer transmitting data in RLC AM mode is changed from a third-type radio bearer to a first-type radio bearer.

Scenario 3: a signaling radio bearer transmitting data in RLC AM mode is changed from a third-type radio bearer to a first-type radio bearer.

Scenario 4: a data radio bearer transmitting data in RLC UM mode is changed from a first-type radio bearer to a third-type radio bearer.

Scenario 5: a data radio bearer transmitting data in RLC AM mode is changed from a first-type radio bearer to a third-type radio bearer.

Scenario 6: a signaling radio bearer transmitting data in RLC AM mode is changed from a first-type radio bearer to a third-type radio bearer.

The following describes a flowchart of the first data processing method with reference to exemplary scenarios.

In a first possible implementation, for scenario 1, the method includes the following steps:

The terminal device receives an RRC connection reconfiguration message transmitted by the base station, where instruction information included in the RRC connection reconfiguration message instructs the terminal device to change a type of a DRBi from a third-type radio bearer to a first-type radio bearer. The DRBi is any DRB that is changed from a third-type radio bearer to a first-type radio bearer in the terminal device.

After determining that the type of the DRBi is changed from the third-type radio bearer to the first-type radio bearer, a data processing method on the transmit side of the terminal device includes:

For a transmit side of an RLC layer entity of the DRBi: discarding all RLC SDUs currently buffered by the transmit side.

Optionally, the method may further include: stopping and resetting all timers of the RLC layer entity of the DRBi, including a reordering timer used to detect a lost RLC PDU; and resetting all state variables of the RLC layer entity of the DRBi to initial values.

For a transmit side of a MAC layer entity:

Optional manner 1: clearing all uplink HARQ buffers, and setting new data indicators (New Data Indicator, NDI) of all uplink HARQ processes to 0.

Optional manner 2: resetting MAC, including all operations that currently need to be performed when MAC is reset, where the operations fall within the prior art, and are not described again herein.

After determining that the type of the DRBi is changed from the third-type radio bearer to the first-type radio bearer, a data processing method on the receive side of the terminal device includes:

For a receive side of the MAC layer entity:

Optional manner 1: clearing all downlink HARQ buffers, setting new data indicators (NDI) of all downlink HARQ processes to 0, and considering transmission of a transport block (TB) subsequently received in each downlink HARQ process as first transmission of the transport block.

Optional manner 2: resetting MAC, including all operations that currently need to be performed when MAC is reset, where the operations fall within the prior art, and are not described again herein.

Optional manner 3: after the type change, if a MAC PDU of the DRBi is received, where the MAC PDU is initially received before the type change of the DRBi, and a MAC SDU included in the MAC PDU includes a MAC SDU corresponding to the DRBi, discarding the MAC SDU of the DRBi in the MAC PDU, to avoid depacketization failure caused by different packet formats of the MAC SDU of the DRBi before and after the type change.

For a receive side of the RLC layer entity of the DRBi: reassembling an RLC PDU that is of the DRBi and is included in a buffer of the receive side and received before the type change of the DRBi but not delivered to a PDCP layer entity, into an RLC SDU based on a packet format before the type change, and delivering data included in the RLC SDU in sequence to the PDCP layer entity of the DRBi.

The method may further include: stopping and resetting all timers of the RLC layer entity of the DRBi, including a reordering timer used to detect a lost RLC PDU; and resetting all state variables of the RLC layer entity of the DRBi to initial values.

For a receive side of the PDCP layer entity of the DRBi: receiving a PDCP PDU delivered by the RLC layer entity of the DRBi due to the type change, and performing processing according to a normal process after the PDCP PDU is received from the RLC layer entity of the DRBi.

In a second possible embodiment, for scenario 2, the method includes the following steps:

The terminal device receives an RRC connection reconfiguration message transmitted by the base station, where instruction information included in the RRC connection reconfiguration message instructs the terminal device to change a type of a DRBi from a third-type radio bearer to a first-type radio bearer. The DRBi is any DRB that is changed from a third-type radio bearer to a first-type radio bearer in the terminal device.

After determining that the type of the DRBi is changed from the third-type radio bearer to the first-type radio bearer, a data processing method on the transmit side of the terminal device includes:

For a transmit side of a PDCP layer entity of the DRBi: retransmitting a PDCP PDU that is delivered to an RLC layer entity of the DRBi before the type change of the DRBi, but successful transmission of which is not acknowledged by the RLC layer entity of the DRBi, and transmitting, to a protocol adaptation layer entity according to a normal process after the type change, the PDCP PDU that needs to be retransmitted by the DRBi.

For a transmit side of the protocol adaptation layer entity of the DRBi:

transmitting, to the RLC layer entity of the DRBi according to a normal process after the type change, the PDCP PDU that needs to be retransmitted and is delivered by the PDCP layer entity of the DRBi after the type change.

For a transmit side of the RLC layer entity of the DRBi: discarding all RLC SDUs and RLC PDUs currently buffered by the transmit side; and processing, according to a normal process after the type change, data that is delivered by the protocol adaptation layer entity and needs to be retransmitted, and then transmitting the data to a MAC layer entity.

Optionally, the method may further include: stopping and resetting all timers of the RLC layer entity of the DRBi, including a reordering timer used to detect a lost RLC PDU; and resetting all state variables of the RLC layer entity of the DRBi to initial values.

For a transmit side of the MAC layer entity: same as that in the scenario 1, and not described again herein.

After determining that the type of the DRBi is changed from the third-type radio bearer to the first-type radio bearer, a data processing method on the receive side of the terminal device includes:

For a receive side of the MAC layer entity corresponding to a logical channel of the DRBi: same as that in the scenario 1, and not described again herein.

For a receive side of the RLC layer entity of the DRBi: same as that in the scenario 1, and not described again herein.

For a receive side of the PDCP layer entity of the DRBi: optionally, determining a sequence number of downlink data (a PDCP PDU) that is not received, and transmitting a PDCP status report to the base station by using the PDCP layer entity, where the PDCP status report is used to notify a sequence number of a downlink packet that is not correctly received, so that the base station retransmits, to the terminal device based on the PDCP status report, the downlink packet that is not successfully transmitted. Optionally, whether the PDCP layer entity needs to transmit the PDCP status report may be configured by the base station.

In a third possible embodiment, for scenario 3, the method includes the following steps:

The terminal device receives an RRC connection reconfiguration message transmitted by the base station, where instruction information included in the RRC connection reconfiguration message instructs the terminal device to change a type of an SRBi from a third-type radio bearer to a first-type radio bearer. The SRBi is any SRB that is changed from a third-type radio bearer to a first-type radio bearer in the terminal device.

After determining that the type of the SRBi is changed from the third-type radio bearer to the first-type radio bearer, a data processing method on the transmit side of the terminal device includes:

For a transmit side of a PDCP layer entity of the SRBi:
retransmitting a PDCP PDU that is delivered to an RLC layer entity of the SRBi before the type change of the SRBi, but successful transmission of which is not acknowledged by the RLC layer entity of the SRBi, and transmitting, to a protocol adaptation layer entity according to a normal process after the type change, the PDCP PDU that needs to be retransmitted by the SRBi.

Optionally, the method further includes: for uplink data transmission, discarding all PDCP SDUs and PDCP PDUs stored by the transmit side; and resetting a value of a variable used to record a sequence number of a next transmitted PDCP SDU and a value used to record a hyper frame number for generating a COUNT value on the transmit side in the PDCP layer entity of the SRBi to 0.

Optionally, the method further includes: for uplink data transmission, after the type change is completed, transmitting, to the protocol adaptation layer entity according to a normal process of transmitting uplink data, a PDCP SDU and a PDCP PDU of the SRBi that are stored and buffered by the transmit side but are not transmitted before the type change, and resetting a value of a variable used to record a sequence number of a next transmitted PDCP SDU and a value used to record a hyper frame number for generating a COUNT value in the PDCP layer entity of the SRBi to 0.

For a transmit side of the protocol adaptation layer entity of the SRBi:
transmitting, to the RLC layer entity of the SRBi according to a normal process after the type change, the PDCP PDU that needs to be retransmitted and is delivered by the PDCP layer entity of the SRBi after the type change.

Optionally, the method further includes: transmitting, to the RLC layer entity according to a normal process of transmitting uplink data after the type change, the PDCP SDU and the PDCP PDU of the SRBi that are buffered but not transmitted before the type change, and are delivered by the PDCP layer entity.

For a transmit side of the RLC layer entity of the SRBi:
discarding all RLC SDUs and RLC PDUs currently buffered by the transmit side; and
processing, according to a normal process after the type change, data that needs to be retransmitted and is delivered by the protocol adaptation layer entity, and then transmitting the data to a MAC layer entity by using a logical channel of the SRBi.

Optionally, the method further includes: transmitting, to the MAC layer entity by using the logical channel of the SRBi after the type change, data that is buffered but not transmitted before the type change, and is delivered by the protocol adaptation layer.

Optionally, the method may further include: stopping and resetting all timers of the RLC layer entity of the SRBi, including a reordering timer used to detect a lost RLC PDU; and resetting all state variables of the RLC layer entity of the SRBi to initial values.

For a transmit side of the MAC layer entity:
Optional manner 1: clearing all uplink HARQ buffers, and setting new data indicators (New Data Indicator, NDI) of all uplink HARQ processes to 0.
Optional manner 2: resetting MAC, including all operations that currently need to be performed when MAC is reset, where the operations fall within the prior art, and are not described again herein.

A MAC SDU that needs to be retransmitted and is delivered by the RLC layer entity of the SRBi is multiplexed to a transport block, and then the transport block is transmitted to a MAC layer entity of the base station.

Optionally, the method further includes: transmitting, to the MAC layer entity of the base station by using an air interface, data that is buffered but not transmitted before the type change, and is delivered by the RLC layer entity of the SRBi.

After determining that the type of the SRBi is changed from the third-type radio bearer to the first-type radio bearer, a data processing method on the receive side of the terminal device includes:

For a receive side of the MAC layer entity:
Optional manner 1: clearing all downlink HARQ buffers, setting NDI of all downlink HARQ processes to 0, and considering transmission of a TB) subsequently received in each downlink HARQ process as first transmission of the transport block.
Optional manner 2: resetting MAC, including all operations that currently need to be performed when MAC is reset, where the operations are known, and are not described again herein.
Optional manner 3: after the type change, if a MAC PDU of the SRBi is received, where the MAC PDU is initially received before the type change of the SRBi, and a MAC SDU included in the MAC PDU includes a MAC SDU corresponding to the SRBi, discarding the MAC SDU of the SRBi in the MAC PDU, to avoid depacketization failure caused by different packet formats of the MAC SDU of the SRBi before and after the type change.

For a receive side of the RLC layer entity of the SRBi:
reassembling an RLC PDU that is of the SRBi and is included in a buffer of the receive side and received before the type change of the SRBi but not delivered to the PDCP layer entity, into an RLC SDU based on a packet format before the type change, and delivering data included in the RLC SDU in sequence to the PDCP layer entity of the SRBi.

Optionally, the method may further include: stopping and resetting all timers of the RLC layer entity of the SRBi, including a reordering timer used to detect a lost RLC PDU; and resetting all state variables of the RLC layer entity of the SRBi to initial values.

For a receive side of the PDCP layer entity of the SRBi:
receiving a PDCP PDU delivered by the RLC layer entity of the SRBi due to the type change, and performing processing according to a normal process after the PDCP PDU is received from the RLC layer entity of the SRBi; and optionally, determining a sequence number of a downlink packet (a PDCP PDU) that is not received, and transmitting a PDCP status report to the base station by using the PDCP layer entity, where the PDCP status report is used to notify the sequence number of the downlink packet that is not correctly received, so that the base station retransmits, to the terminal device based on the PDCP status report, the downlink packet that is not successfully transmitted. Optionally, whether the PDCP layer entity needs to transmit the PDCP status report may be configured by the base station.

Optionally, the method further includes: for downlink data transmission, discarding all downlink PDCP SDUs and PDCP PDUs that are buffered on the receive side; and SRBiresetting a value of a variable used to record a sequence number of a next received PDCP SDU and a value used to record a hyper frame number for generating a COUNT value on the receive side in the PDCP layer entity of the SRBi to 0.

Optionally, the method further includes: for downlink data transmission, delivering, to an RRC layer, a received PDCP PDU that is delivered by the RLC layer entity due to the type change of the SRBi, and resetting a value of a variable used to record a sequence number of a next transmitted PDCP SDU and a value used to record a hyper frame number for generating a COUNT value on the receive side in the PDCP layer entity of the SRBi to 0.

In a fourth possible embodiment, for scenario 4, the method includes the following steps:

The terminal device receives an RRC connection reconfiguration message, where instruction information included in the RRC connection reconfiguration message instructs the terminal device to change a type of a DRBi from a first-type radio bearer to a third-type radio bearer.

After determining that the type of the DRBi is changed from the first-type radio bearer to the third-type radio bearer, a data processing method on the transmit side of the terminal device includes:

For a transmit side of a protocol adaptation layer entity of the DRBi: clearing all uplink data that is currently buffered.

For a transmit side of an RLC layer entity of the DRBi: same as that in the scenario 1, and not described again herein.

For a transmit side of a MAC layer entity: same as that in the scenario 1, and not described again herein.

After determining that the type of the DRBi is changed from the first-type radio bearer to the third-type radio bearer, a data processing method on the receive side of the terminal device includes:

For a receive side of the MAC layer entity: same as that in the scenario 1, and not described again herein.

For a receive side of the RLC layer entity of the DRBi: reassembling an RLC PDU that is of the DRBi and is included in a buffer of the receive side and received before the type change of the DRBi but not delivered to the protocol adaptation layer entity, into an RLC SDU based on a packet format before the type change, and delivering data included in the RLC SDU in sequence to the protocol adaptation layer entity of the DRBi.

Optionally, the method may further include: stopping and resetting all timers of the RLC layer entity of the DRBi, including a reordering timer used to detect a lost RLC PDU; and resetting all state variables of the RLC layer entity of the DRBi to initial values.

For a receive side of the protocol adaptation layer entity of the DRBi:

receiving a protocol adaptation layer PDU delivered by the RLC layer entity of the DRBi due to the type change, processing a PDCP PDU included in the protocol adaptation layer PDU, and then delivering the PDCP PDU to the PDCP layer entity.

Optionally, if a data part (that is, the PDCP PDU) in the protocol adaptation layer PDU delivered by the RLC layer entity of the DRBi is transmitted to the terminal device, the data part is processed and then is delivered to the PDCP layer entity; or if it is transmitted to a remote terminal served by the terminal device, the data part in the protocol adaptation layer PDU is discarded.

For a receive side of the PDCP layer entity of the DRBi:

receiving a PDCP PDU delivered by the protocol adaptation layer entity of the DRBi, and performing processing according to a normal process after the PDCP PDU is received from the protocol adaptation layer entity.

In a fifth possible embodiment, for scenario 5, the method includes the following steps:

The terminal device receives an RRC connection reconfiguration message, where instruction information included in the RRC connection reconfiguration message instructs the terminal device to change a type of a DRBi from a first-type radio bearer to a third-type radio bearer.

After determining that the type of the DRBi is changed from the first-type radio bearer to the third-type radio bearer, a data processing method on the transmit side of the terminal device includes:

For a transmit side of a PDCP layer entity of the DRBi:

retransmitting, according to a normal process after the type change, a PDCP PDU that is delivered to a protocol adaptation layer entity of the DRBi before the type change of the DRBi, but successful transmission of which is not acknowledged by the protocol adaptation layer entity of the DRBi, and transmitting, to an RLC layer entity, the PDCP PDU that needs to be retransmitted by the SRBi.

For a transmit side of the protocol adaptation layer entity of the DRBi: clearing all uplink data that is currently buffered.

For a transmit side of the RLC layer entity of the DRBi: discarding RLC SDUs and RLC PDUs currently buffered by the transmit side; and processing, based on a packet format of an RLC SDU before the type change, an RLC SDU that needs to be retransmitted and is delivered by the PDCP layer entity after the type change, into an RLC PDU that needs to be retransmitted, and transmitting, to a MAC layer entity by using a logical channel of the DRBi, the RLC PDU that needs to be retransmitted.

Optionally, the method may further include: stopping and resetting all timers of the RLC layer entity of the DRBi, including a reordering timer used to detect a lost RLC PDU; and resetting all state variables of the RLC layer entity of the DRBi to initial values.

For a transmit side of the MAC layer entity:

multiplexing data that needs to be retransmitted and is included in the DRBi after the type change, to a transport block, and then transmitting the transport block to a MAC layer entity of the base station. Other steps are the same as those in the scenario 1, and are not described again herein.

After determining that the type of the DRBi is changed from the first-type radio bearer to the third-type radio bearer, a data processing method on the receive side of the terminal device includes:

For a receive side of the MAC layer entity: same as that in the scenario 1, and not described again herein.

For a receive side of the RLC layer entity of the DRBi: content is the same as that in the scenario 4, and is not described again herein.

For a receive side of the protocol adaptation layer entity of the DRBi: content is the same as that in the scenario 4, and is not described again herein.

For a receive side of the PDCP layer entity of the DRBi:

optionally, determining a sequence number of a downlink packet (a PDCP PDU) that is not received, and transmitting a PDCP status report to the base station by using the PDCP layer entity, where the PDCP status report is used to notify the sequence number of the downlink packet that is not correctly received, so that the base station retransmits, to the terminal device based on the PDCP status report, the downlink packet that is not successfully transmitted. Optionally, whether the PDCP layer entity needs to transmit the PDCP status report may be configured by the base station. Other steps are the same as those in the scenario 4, and are not described again herein.

In a sixth possible embodiment, for scenario 6, the data processing method includes the following steps:

The terminal device receives an RRC connection reconfiguration message, where instruction information included in the RRC connection reconfiguration message instructs the terminal device to change a type of a DRBi from a first-type radio bearer to a third-type radio bearer.

After determining that the type of the DRBi is changed from the first-type radio bearer to the third-type radio bearer, a data processing method on the transmit side of the terminal device includes:

For a transmit side of a PDCP layer entity of the SRBi:

retransmitting, according to a normal process after the type change, a PDCP PDU that is delivered to a protocol adaptation layer entity of the SRBi before the type change of the SRBi, but successful transmission of which is not acknowledged by the protocol adaptation layer entity of the SRBi, and transmitting, to an RLC layer entity, the PDCP PDU that needs to be retransmitted by the SRBi.

Optionally, the method further includes: for uplink data transmission, discarding all PDCP SDUs and PDCP PDUs stored by the transmit side; and resetting a value of a variable used to record a sequence number of a next transmitted PDCP SDU and a value used to record a hyper frame number for generating a COUNT value in the PDCP layer entity of the SRBi to 0.

Optionally, the method further includes: for uplink data transmission, after the type change is completed, transmitting, to the RLC layer entity according to a normal process of transmitting uplink data, a PDCP SDU and a PDCP PDU of the SRBi that are stored by the transmit side before the type change, and resetting a value of a variable used to record a sequence number of a next transmitted PDCP SDU and a value used to record a hyper frame number for generating a COUNT value in the PDCP layer entity of the SRBi to 0.

For a transmit side of the protocol adaptation layer entity of the SRBi: clearing uplink data that is currently buffered.

For a transmit side of the RLC layer entity of the SRBi: discarding RLC SDUs and RLC PDUs currently buffered by the transmit side.

Optionally, the method may further include: stopping and resetting all timers of the RLC layer entity of the SRBi, including a reordering timer used to detect a lost RLC PDU; and resetting all state variables of the RLC layer entity of the SRBi to initial values; and processing, based on a packet format of an RLC SDU before the type change, an RLC SDU that needs to be retransmitted and is delivered by the PDCP layer entity after the type change, into an RLC PDU that needs to be retransmitted, and transmitting, to a MAC layer entity by using a logical channel of the SRBi, the RLC PDU that needs to be retransmitted.

Optionally, the method further includes: transmitting, to the MAC layer entity according to a normal process of transmitting uplink data after the type change, an RLC SDU and an RLC PDU of the SRBi that are buffered but not transmitted before the type change, and are delivered by the PDCP layer entity.

For a transmit side of the MAC layer entity:

multiplexing, according to a normal process after the type change, a MAC PDU of a MAC SDU that needs to be retransmitted and is included in the SRBi after the type change, to a transport block, and then transmitting the transport block to a MAC layer entity of the base station.

Optionally, the method further includes: transmitting, to the MAC layer entity of the base station by using an air interface and according to a normal process of transmitting uplink data after the type change, a MAC SDU and a MAC PDU that are buffered but not transmitted before the type change, and are delivered by the logical channel of the SRBi. Other steps are the same as those in the scenario 1, and are not described again herein.

After determining that the type of the SRBi is changed from the first-type radio bearer to the third-type radio bearer, a data processing method on the receive side of the terminal device includes:

For a receive side of the MAC layer entity: same as that in the scenario 3, and not described again herein.

For a receive side of the RLC layer entity of the SRBi:

reassembling an RLC PDU that is of the SRBi and is included in a buffer of the receive side and received before the type change of the SRBi but not delivered to the protocol adaptation layer entity, into an RLC SDU based on a packet format before the type change, and delivering data included in the RLC SDU in sequence to the protocol adaptation layer entity of the SRBi.

Optionally, the method may further include: stopping and resetting all timers of the RLC layer entity of the SRBi, including a reordering timer used to detect a lost RLC PDU; and resetting all state variables of the RLC layer entity of the SRBi to initial values.

For a receive side of the protocol adaptation layer entity of the SRBi:

receiving a protocol adaptation layer PDU delivered by the RLC layer entity of the SRBi due to the type change, processing the protocol adaptation layer PDU into a PDCP PDU, and delivering the PDCP PDU to the PDCP layer entity of the SRBi.

For a receive side of the PDCP layer entity of the SRBi:

receiving the PDCP PDU delivered by the protocol adaptation layer entity of the SRBi due to the type change, and performing processing according to a normal process after the PDCP PDU is received from the protocol adaptation layer entity of the SRBi. Other optional embodiments are the same as those in the scenario 3, and are not described again herein.

Figure 5:
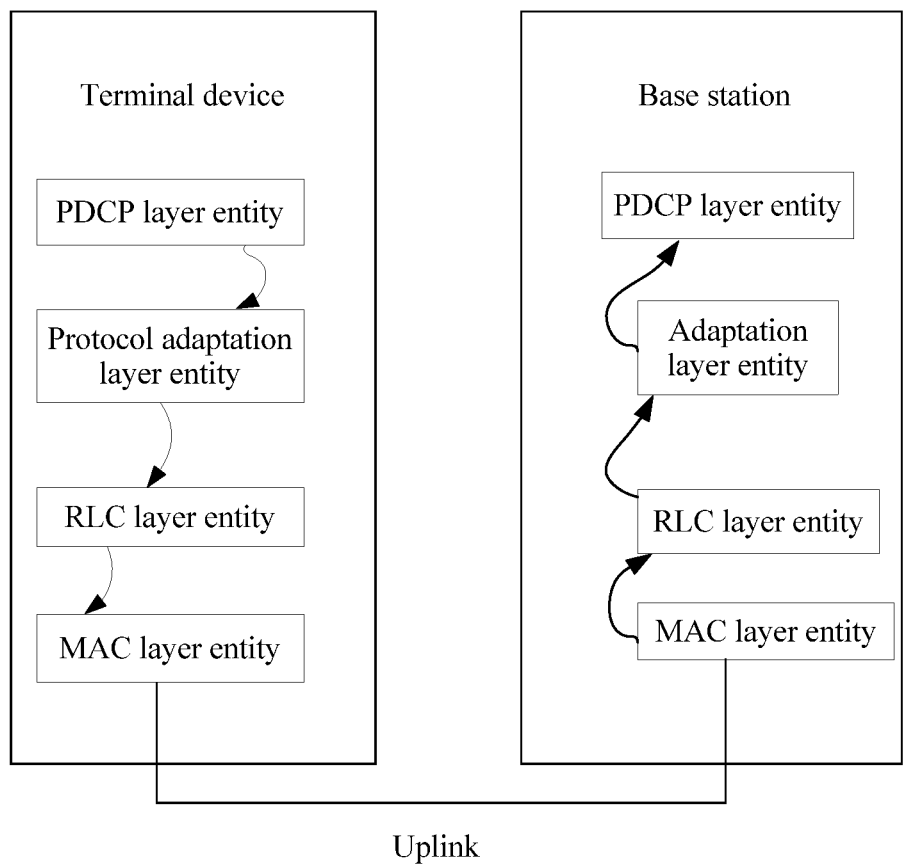
FIG. 5 is a flowchart of an uplink data transmission process when a third-type radio bearer is changed to a first-type radio bearer according to an embodiment.

After the terminal device performs the foregoing data processing in scenario 1, scenario 2, and scenario 3, for a process of transmitting uplink data of at least one data radio bearer of the terminal device, refer to FIG. 5. The transmit side of the PDCP layer entity, the transmit side of the protocol adaptation layer entity, the transmit side of the RLC layer entity, and the transmit side of the MAC layer entity of the DRBi transmit uplink data in sequence according to a process of transmitting uplink data after the type change. Corresponding to the DRBi, the MAC layer entity, RLC layer entity, protocol adaptation layer entity, and PDCP layer entity of the base station side receive the uplink data in sequence according to a process of receiving uplink data after the type change.

Figure 6:
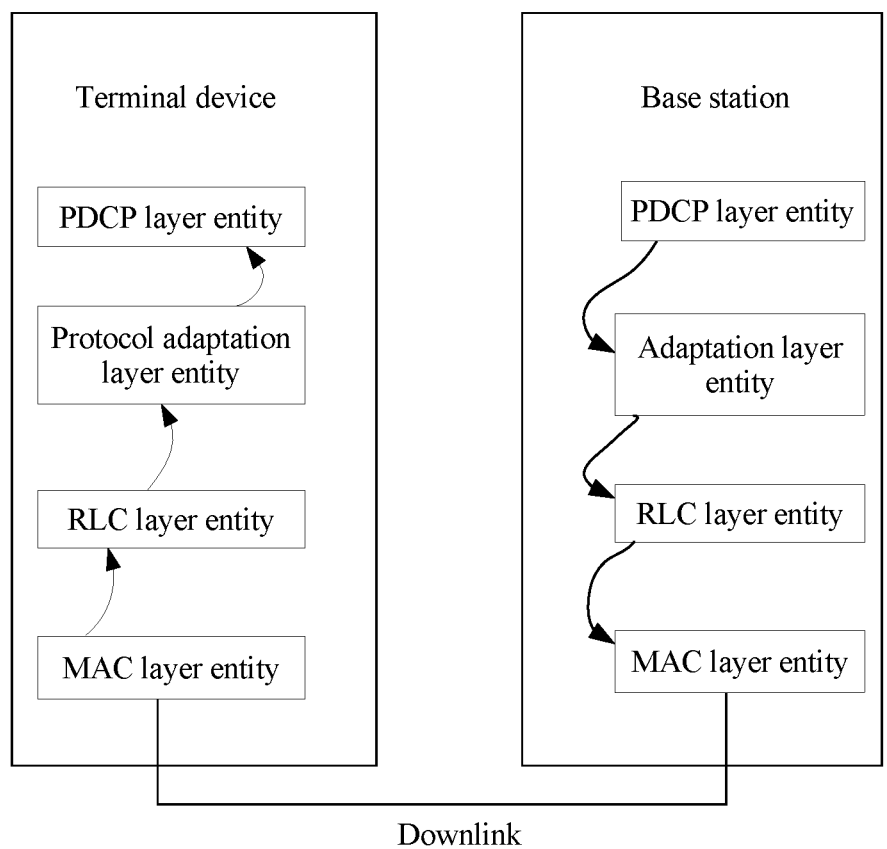
FIG. 6 is a flowchart of a downlink data transmission process when a third-type radio bearer is changed to a first-type radio bearer according to an embodiment.

After the terminal device performs the foregoing data processing in scenario 1, scenario 2, and scenario 3, for a process of transmitting downlink data of at least one data radio bearer of the terminal device, refer to FIG. 6. The receive side of the PDCP layer entity, the receive side of the protocol adaptation layer entity, the receive side of the RLC layer entity, and the receive side of the MAC layer entity of the DRBi receive downlink data in sequence according to a process of receiving downlink data after the type change. Corresponding to the DRBi, the MAC layer entity, RLC layer entity, protocol adaptation layer entity, and PDCP layer entity of the base station side transmit the downlink data in sequence according to a process of transmitting downlink data after the type change.

Figure 7:
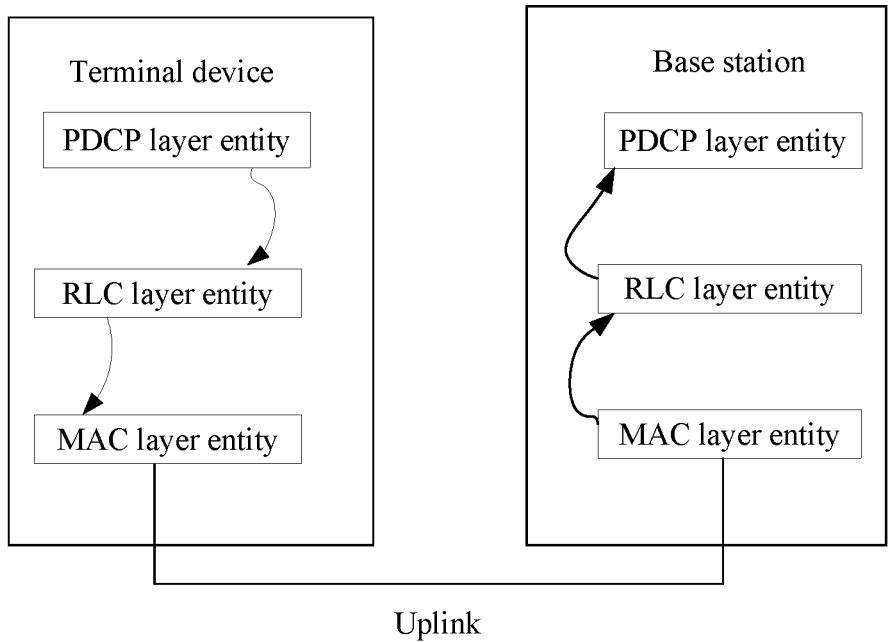
FIG. 7 is a flowchart of an uplink data transmission process when a first-type radio bearer is changed to a third-type radio bearer according to an embodiment.

After the terminal device performs the foregoing data processing in scenario 4, scenario 5, and scenario 6, for a process of transmitting uplink data of at least one data radio bearer of the terminal device, refer to FIG. 7. The transmit side of the PDCP layer entity, the transmit side of the RLC layer entity, and the transmit side of the MAC layer entity of the DRBi transmit uplink data in sequence according to a process of transmitting uplink data after the type change. Corresponding to the DRBi, the MAC layer entity, RLC layer entity, and PDCP layer entity of the base station side receive the uplink data in sequence according to a process of receiving uplink data after the type change.

Figure 8:
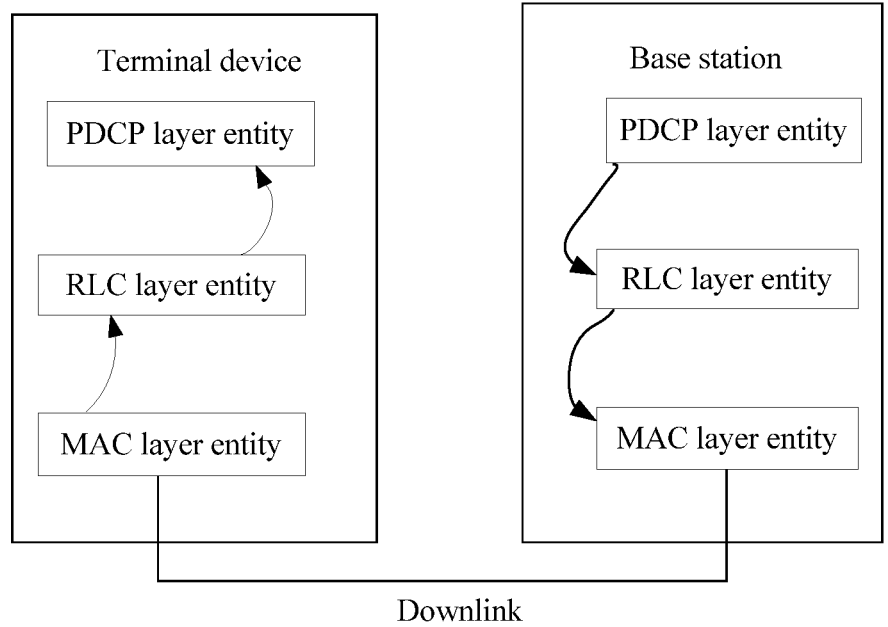
FIG. 8 is a flowchart of a downlink data transmission process when a first-type radio bearer is changed to a third-type radio bearer according to an embodiment

After the terminal performs the foregoing data processing in scenario 4, scenario 5, and scenario 6, for a process of transmitting downlink data of at least one data radio bearer of the terminal device, refer to FIG. 8. The receive side of the PDCP layer entity, the receive side of the RLC layer entity, and the receive side of the MAC layer entity of the DRBi receive downlink data in sequence according to a process of receiving downlink data after the type change. Corresponding to the DRBi, the MAC layer entity, RLC layer entity, and PDCP layer entity of the base station side transmit the downlink data in sequence according to a process of transmitting downlink data after the type change.

Optionally, for uplink data transmission, the method further includes: the base station determines a sequence number of an uplink packet that is not received, and transmits a PDCP status report to the terminal device by using the PDCP layer entity, where the PDCP status report is used to notify the sequence number of the uplink packet that is of the DRBi and is not correctly received, so that the terminal device retransmits the packet to the base station based on the PDCP status report. Optionally, whether the PDCP layer entity needs to transmit the PDCP status report may be configured by the base station.

Optionally, for uplink data transmission, the method further includes: the base station determines a sequence number of an uplink packet that is of the SRBi and is not received, and transmits a PDCP status report to the terminal device by using the PDCP layer entity, where the PDCP status report is used to notify the sequence number of the uplink packet that is of the SRBi and is not correctly received, so that the terminal device retransmits the packet of the SRBi to the base station based on the PDCP status report. A format and content of the PDCP status report of the SRBi are different from those of the PDCP status report of the DRBi.

With reference to an accompanying figure, the following describes a second data processing method.

Figure 9:
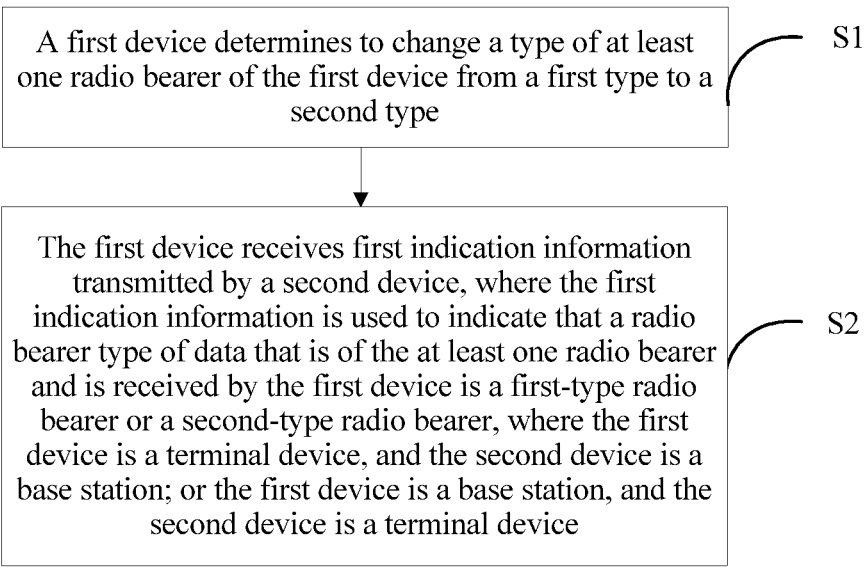
FIG. 9 is a method flowchart of a data processing method according to an embodiment.

A data processing method, as shown in FIG. 9, is used to resolve a technical problem about how to avoid a packet loss when a type of a radio bearer of a terminal device is changed between a first type and a third type. The method includes the following steps.

In step S1: a first device determines to change a type of at least one radio bearer of the first device from a first type to a second type.

In step S2: the first device receives first indication information transmitted by a second device, where the first indication information is used to indicate that a radio bearer type of data that is of the at least one radio bearer and is received by the first device is a first-type radio bearer or a second-type radio bearer.

The first device is a terminal device, and the second device is a base station; or the first device is a base station, and the second device is a terminal device.

Optionally, the first indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Optionally, after step S2, the method further includes:

the first device receives an RLC protocol data unit of the at least one radio bearer;

the first device determines, based on the first indication information and a sequence number of the received RLC protocol data unit of the at least one radio bearer, that a radio bearer type of the received RLC protocol data unit of the at least one radio bearer is the first-type radio bearer or the second-type radio bearer; and the first device determines, based on the radio bearer type of the received RLC protocol data unit of the at least one radio bearer, an upper layer entity for the received RLC protocol data unit of the at least one radio bearer, where the upper layer entity is an upper layer entity of an RLC protocol layer of the at least one radio bearer before the type of the at least one radio bearer is changed or after the type of the at least one radio bearer is changed.

Optionally, when the first indication information includes the RLC sequence number, that the first device obtains first indication information includes:

the first device receives an RRC connection reconfiguration message that is of the at least one radio bearer and is transmitted by the second device, where the RRC connection reconfiguration message includes the first indication information; or the first device receives an RLC control protocol data unit that is of the at least one radio bearer and is transmitted by the second device, where the RLC control protocol data unit includes the first indication information.

Optionally, when the first indication information does not include the RLC sequence number, that the first device obtains first indication information includes:

the first device receives a MAC protocol data unit transmitted by the second device, where the MAC protocol data unit includes a MAC service data unit of the at least one radio bearer, and a MAC subheader corresponding to the MAC service data unit carries the first indication information.

Optionally, the method further includes:

the first device transmits second indication information to the second device, where the second indication information is used to notify that a radio bearer type of data that is of the at least one radio bearer and is received by the second device is the first-type radio bearer or the second-type radio bearer.

Optionally, the second indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Optionally, when the second indication information includes the RLC sequence number, that the first device transmits second indication information to the second device includes:

the first device transmits an RRC connection reconfiguration complete message of the at least one radio bearer to the second device, where the RRC connection reconfiguration complete message includes the second indication information; or the first device transmits an RLC control protocol data unit of the at least one radio bearer to the second device, where the RLC control protocol data unit includes the second indication information.

Optionally, when the second indication information does not include the RLC sequence number, that the first device transmits second indication information to the second device includes: the first device transmits a MAC protocol data unit to the second device, where the MAC protocol data unit includes a MAC service data unit of the at least one radio bearer, and a MAC subheader corresponding to the MAC service data unit carries the second indication information. The following descriptions are provided with reference to embodiments.

This embodiment provides a data processing method on a terminal device side, where the method includes:

a terminal device determines to change a type of at least one radio bearer of the terminal device from a first type to a second type; and the terminal device obtains first indication information, where the first indication information is used to indicate that a radio bearer type of data that is of the at least one radio bearer and is received by the terminal device after the type of the at least one radio bearer is changed is a first-type radio bearer or a second-type radio bearer.

After the terminal device obtains the first indication information, the method further includes:

the terminal device receives an RLC protocol data unit of the at least one radio bearer; and the terminal device determines an upper layer entity for the RLC protocol data unit of the at least one radio bearer based on the first indication information and a sequence number of the RLC protocol data unit of the at least one radio bearer.

That the type of the at least one radio bearer of the terminal device is changed from the first type to the second type includes that the type may be changed from the third-type radio bearer to the first-type radio bearer or may be changed from the first-type radio bearer to the third-type radio bearer.

Optionally, the first indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

When the first indication information includes the RLC sequence number, that the terminal device determines an upper layer entity for the RLC protocol data unit of the at least one radio bearer based on the first indication information and a sequence number of the RLC protocol data unit of the at least one radio bearer includes:

the terminal device determines, based on the first indication information and the sequence number of the received RLC protocol data unit of the at least one radio bearer, that a radio bearer type of the received RLC protocol data unit of the at least one radio bearer is the first-type radio bearer or the second-type radio bearer; and the terminal device determines, based on the radio bearer type of the received RLC protocol data unit of the at least one radio bearer, whether the upper layer entity for the received RLC protocol data unit of the at least one radio bearer is a PDCP layer entity or a protocol adaptation layer entity.

On this basis, in a first possible implementation, the terminal device obtains first indication information includes:

the terminal device receives an RRC connection reconfiguration message that is of the at least one radio bearer and is transmitted by a base station, where the RRC connection reconfiguration message includes the first indication information.

For example, for downlink data transmission, to enable the terminal device eRelay UE serving as a relay terminal to know, after a type of a radio bearer is changed, whether a packet received from the radio bearer needs to be delivered to a PDCP layer or an adaptation layer after RLC layer processing, the base station notifies, in an RRC connection reconfiguration message, the eRelay UE of a sequence number of an RLC PDU of the radio bearer whose type is changed, where the RLC PDU has a sequence number corresponding to a first RLC PDU including an RLC SDU encapsulated based on a corresponding packet format after the type change. Alternatively, the RLC PDU has a sequence number corresponding to a last RLC PDU including an RLC SDU encapsulated based on a corresponding packet format before the type change.

Figure 3A:
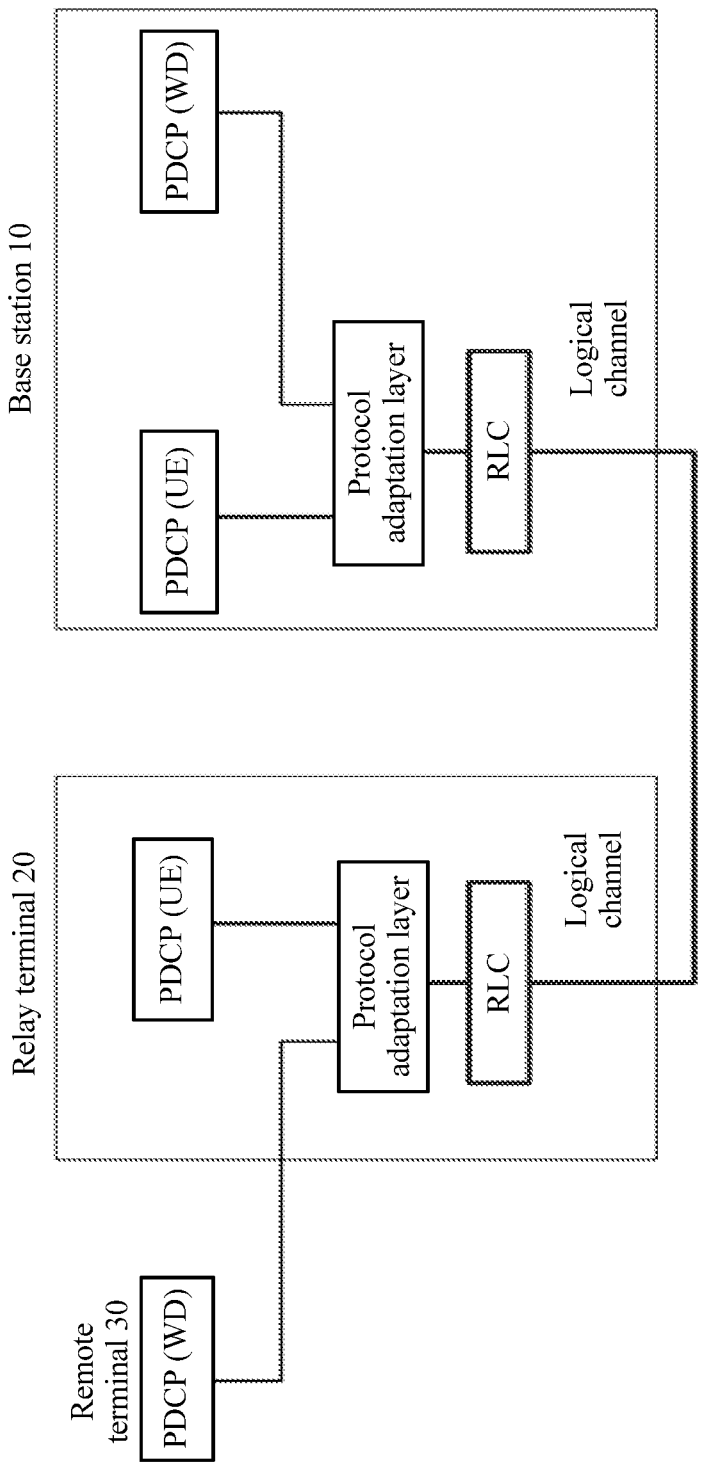
FIG. 3(a) is a schematic diagram of a communications protocol stack of an access network according to an embodiment.
Figure 3B:
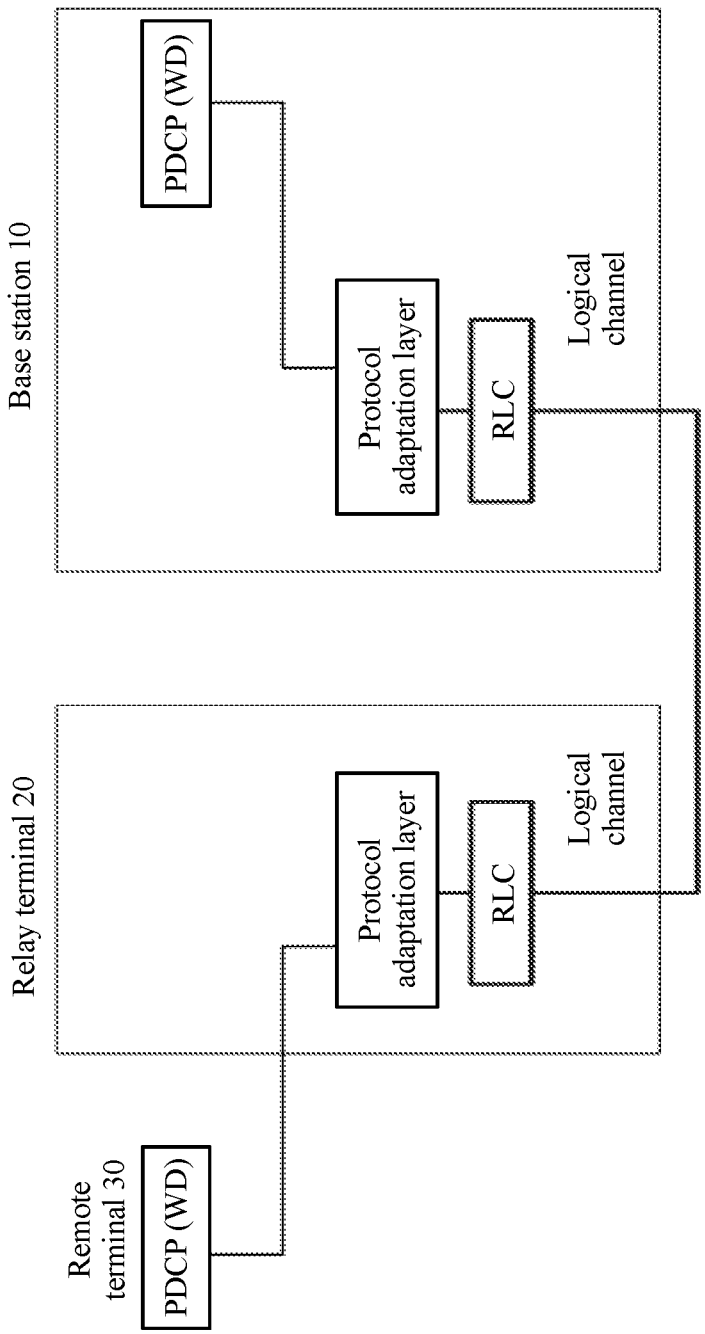
FIG. 3(b) is a schematic diagram of a communications protocol stack of an access network according to an embodiment.
Figure 3C:
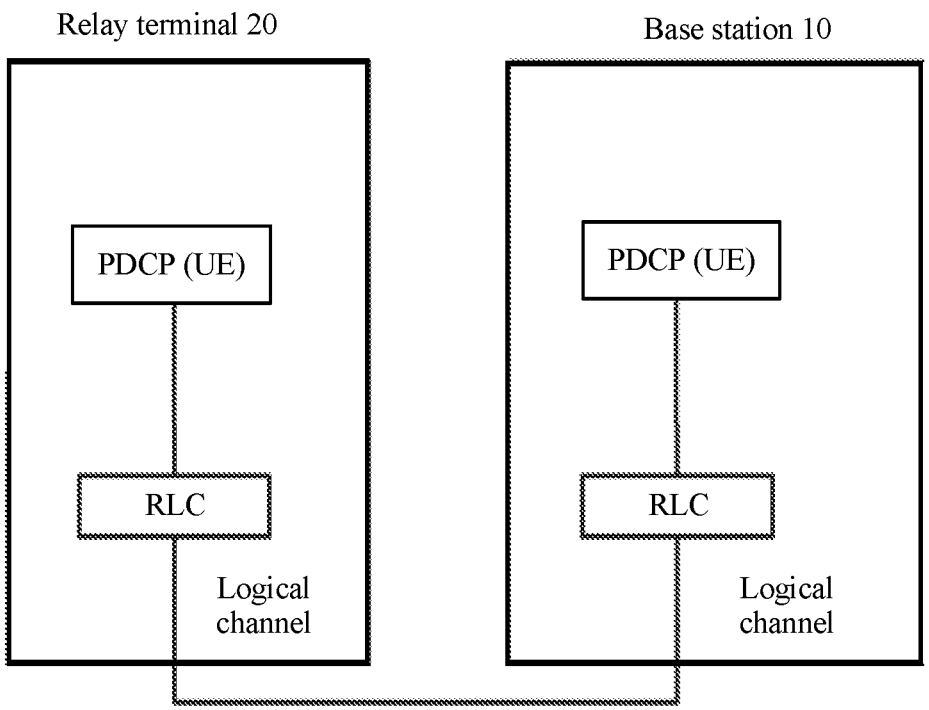
FIG. 3(c) is a schematic diagram of a communications protocol stack of an access network according to an embodiment.
Figure 3D:
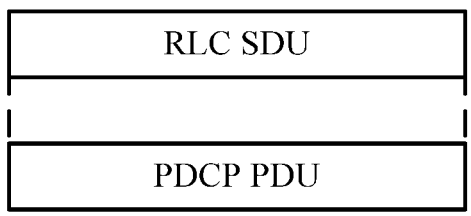
FIG. 3(d) is a schematic diagram of a packet format of a packet of a third-type radio bearer according to an embodiment.
Figure 3E:
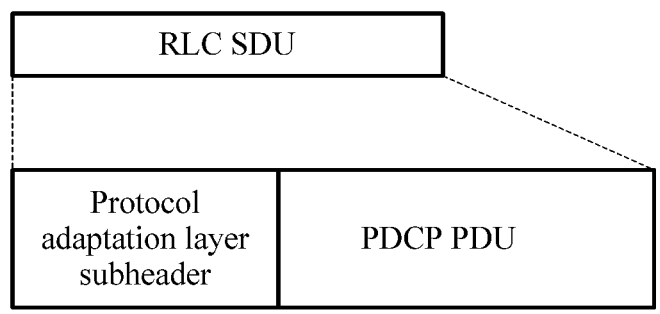
FIG. 3(e) is a schematic diagram of a packet format of a packet of a first-type radio bearer according to an embodiment.

When a radio bearer is changed from a third-type radio bearer to a first-type radio bearer, a format of an RLC SDU of the third-type radio bearer is shown in FIG. 3(d), and a format of an RLC SDU of the first-type radio bearer is shown in FIG. 3(e). The following describes how to implement the foregoing method, by using an example of downlink data transmission after a radio bearer is changed from a third-type radio bearer to a first-type radio bearer.

First, in an RRC connection reconfiguration message, the base station notifies the eRelay UE of an RLC sequence number of an RLC PDU transmitted over a radio bearer whose type is changed, where the RLC sequence number is a sequence number corresponding to a first RLC PDU including the RLC SDU shown in FIG. 3(e); or the RLC sequence number is a sequence number corresponding to a last RLC PDU including the RLC SDU shown in FIG. 3(d).

Then, after the type of the radio bearer is changed, when the eRelay UE receives the RLC PDU from the radio bearer, the eRelay UE determines, based on the sequence number included in the RLC PDU, whether the received RLC PDU after being processed needs to be delivered to a PDCP layer entity or delivered to a protocol adaptation layer entity.

For example, for a DRB, the RLC sequence number in the first indication information is the sequence number corresponding to the first RLC PDU including the RLC SDU of the DRB, as shown in FIG. 3(e). For example, the RLC sequence number is 99. After the type of the DRB is changed, if a sequence number included in an RLC PDU received by the eRelay UE from the DRB is 100, the eRelay UE determines whether the received RLC PDU, after being processed by an RLC layer entity, needs to be delivered to the protocol adaptation layer entity or the PDCP layer entity. After the type of the DRB is changed, if a sequence number included in an RLC PDU received by the eRelay UE from the DRB is 98, the eRelay UE determines that the received RLC PDU after being processed by the RLC layer entity needs to be delivered to the PDCP layer entity.

After the radio bearer is changed from the first type to the third type, operations for downlink data transmission are the same as those in the foregoing embodiment. After the radio bearer is changed to the third type, to process a packet buffered by the base station side before the type change, the eRelay UE needs to continue to use the upper layer entity adaptation layer of the RLC layer entity for a period of time after the type of the radio bearer is changed. After determining that all packets buffered by the base station side before the type change have been processed, the eRelay UE may choose to release the adaptation layer.

It can be noted that, in this embodiment, after the base station notifies, by using the RRC connection reconfiguration message, the eRelay UE of a corresponding RLC sequence number, the base station and the eRelay UE side may not or cannot perform concatenation and segmentation operations any longer on an RLC SDU received before the type change and buffered at the current RLC layer.

On this basis, in a second possible embodiment, the terminal device obtains first indication information that includes:

the terminal device receives an RLC control protocol data unit that is of the at least one radio bearer and is transmitted by the base station, where the RLC control protocol data unit includes the first indication information.

For example, first, an RLC control PDU is newly defined. The RLC control PDU is used to notify the RLC sequence number included in the first indication information, where the RLC sequence number is a sequence number of an RLC PDU of the at least one radio bearer of the terminal device, and the RLC PDU has a sequence number corresponding to a first RLC PDU including an RLC SDU encapsulated based on a corresponding packet format after the type change. Alternatively, the RLC PDU has a sequence number corresponding to a last RLC PDU including an RLC SDU encapsulated based on a corresponding packet format before the type change.

Then the base station transmits, over the radio bearer whose type is changed, the RLC control PDU corresponding to the radio bearer. Therefore, after the terminal device receives the RLC control PDU over the radio bearer, the terminal device can know, for a data part included in the RLC PDU transmitted over the radio bearer, which needs to be delivered to a PDCP layer and which needs to be delivered to an adaptation layer.

Figure 10:
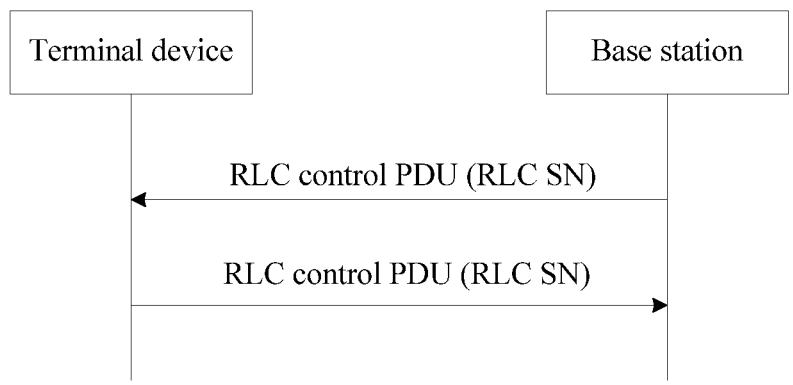
FIG. 10 is a flowchart of a method for transmitting an RLC control PDU according to an embodiment.

Optionally, as shown in FIG. 10, the base station side delivers, by using an RLC layer entity of the radio bearer, the first indication information including the RLC control PDU, and the terminal device side receives, by using an RLC layer entity of the radio bearer, the first indication information including the RLC control PDU and transmitted by the base station.

Figure 11A:
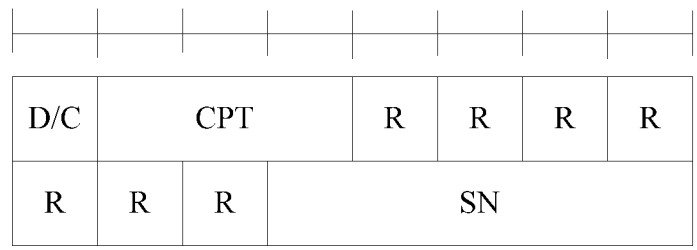
FIG. 11(a) is a schematic structural diagram of an RLC control PDU according to an embodiment.
Figure 11B:
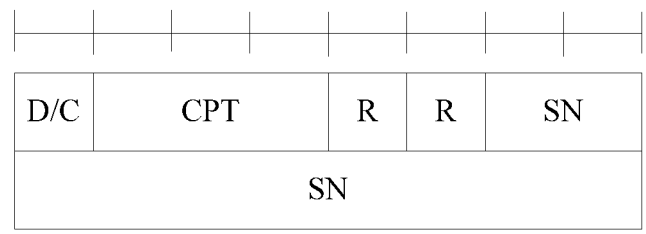
FIG. 11(b) is a schematic structural diagram of an RLC control PDU according to an embodiment.
Figure 11C:
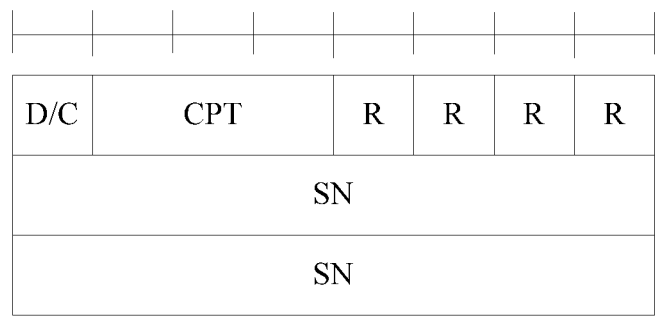
FIG. 11(c) is a schematic structural diagram of an RLC control PDU according to an embodiment.

Optionally, three examples of formats of RLC control PDUs are shown in FIG. 11(a), FIG. 11(b), and FIG. 11(c), and lengths of RLC SNs corresponding to the formats are respectively 5 bits, 10 bits, and 16 bits. Meanings of fields included in a format of an RLC control PDU are as follows:

A D/C field occupies one bit, and is used to indicate whether an RLC PDU including an RLC sequence number is an RLC data PDU or an RLC control PDU.

A CPT field occupies three bits, and is used to indicate a type of the control PDU, and for an RLC control PDU, used to indicate the type of the control PDU. Definitions of current values of the field are shown in the following Table 1. For the newly defined control PDU, a current reserved value is used to indicate the type of the control PDU. For example, 001 may be used to indicate the newly defined control PDU.

R is a reserved bit.

An SN is a sequence number of the RLC PDU. It may be the sequence number corresponding to the first RLC PDU including the RLC SDU encapsulated based on the corresponding packet format after the type change, or the sequence number corresponding to the last RLC PDU including the RLC SDU encapsulated based on the corresponding packet format before the type change. A length of the SN may be 5 bits, 10 bits, and 16 bits. An actually used length is configured by the base station.

Optionally, for downlink data transmission, an occasion for generating the control PDU is: generating the RLC control PDU after the RLC layer entity of the base station has transmitted the last RLC PDU including the RLC SDU received from an upper layer entity before the type change, or after the RLC layer entity of the base station determines the sequence number of the last RLC PDU including the RLC SDU received from an upper layer entity before the type change; or generating the RLC control PDU after the RLC layer entity of the base station has transmitted the first RLC PDU including the RLC SDU received from an upper layer entity after the type change, or after the RLC layer entity of the base station determines the sequence number of the first RLC PDU including the RLC SDU received from an upper layer entity after the type change.

Optionally, for downlink data transmission, after the type of the radio bearer is changed, the RLC layer entity of the terminal device does not deliver an RLC SDU obtained by assembling an RLC PDU to a corresponding upper layer entity, that is, a PDCP 1 layer entity or an adaptation layer entity, in sequence until the RLC layer entity of the terminal device receives the RLC control PDU transmitted by the base station.

TABLE 1

| Value | Description |
| --- | --- |
| 000 | STATUS PDU |
| 001 to 111 | Reserved (PDUs with this coding will be discarded by the receiving entity for this release of the protocol) |

Optionally, when the first indication information does not include the RLC sequence number, the terminal device receives a MAC protocol data unit transmitted by the base station, where the MAC protocol data unit includes a MAC service data unit of the at least one radio bearer, and a MAC subheader corresponding to the MAC service data unit carries the first indication information.

On this basis, when the first indication information does not include the RLC sequence number, the terminal device determines the upper layer entity for the RLC protocol data unit of the at least one radio bearer based on the indication information in the MAC subheader corresponding to the MAC service data unit.

Optionally, the indication information in the MAC subheader includes: when an indication value is 0, it indicates that data included in the MAC SDU should be transmitted to the PDCP layer entity after being processed by the RLC layer entity, or when an indication value is 1, it indicates that data included in the MAC SDU should be transmitted to the protocol adaptation layer entity after being processed by the RLC layer entity, or vice versa.

For example, the foregoing notification is implemented by using a MAC layer.

Figure 12:
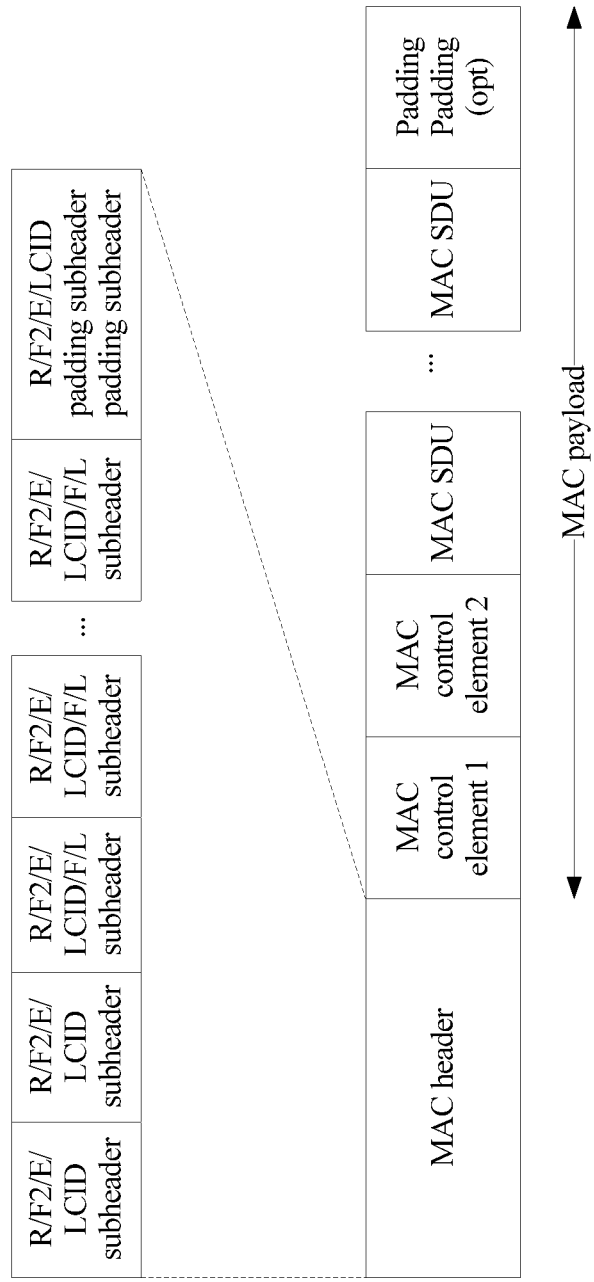
FIG. 12 is a schematic structural diagram of a MAC PDU according to an embodiment.

A format of a MAC PDU is shown in FIG. 12. One MAC PDU may include a number of MAC SDUs, where each MAC SDU comes from a logical channel of a radio bearer. Each MAC SDU has a MAC subheader corresponding to the MAC SDU. A MAC subheader of a MAC SDU includes a logical channel identifier field (LCID) and a reserved bit R field, and further includes other fields.

An LCID field of a MAC subheader of a MAC SDU is used to indicate a logical channel of a radio bearer from which the MAC SDU comes. Therefore, based on the LCID, a receiving device can know an RLC entity to which the MAC SDU corresponding to the logical channel should be delivered.

For an R field in a MAC subheader of a MAC SDU, currently a bit value of the R field is only set to 0 in the prior art.

In this embodiment, when the bit value of the R field in the MAC subheader of the MAC SDU is set to 0, it may indicate that data included in the MAC SDU should be transmitted to the PDCP layer entity after being processed by the RLC layer entity; or when the bit value of the R field is 1, it indicates that data included in the MAC SDU should be transmitted to the protocol adaptation layer entity after being processed by the RLC layer entity, or vice versa.

Regardless of uplink data transmission or downlink data transmission, for a transmitting device, after the radio bearer is changed, when the RLC layer entity corresponding to the radio bearer starts to transmit an RLC PDU including an RLC SDU encapsulated based on the packet format after the type change, when the RLC entity delivers the RLC PDU to the MAC layer, the RLC entity uses an indication to notify the MAC layer that the RLC PDU includes the RLC SDU encapsulated based on the packet format after the type change. When the RLC layer entity corresponding to the radio bearer still transmits, in a period of time, an RLC PDU including an RLC SDU encapsulated based on the packet format before the type change, when delivering the RLC PDU to the MAC layer entity, the RLC entity uses an indication to notify the MAC layer that the RLC PDU includes the RLC SDU encapsulated based on the packet format before the type change. Regardless of uplink data transmission or downlink data transmission, for the receiving device, after the MAC layer entity receives a MAC PDU, the MAC layer entity determines, based on an LCID in a subheader corresponding to each MAC SDU, whether the MAC SDU comes from the radio bearer whose type is changed. If yes, the MAC layer entity determines, based on a bit value of R in the subheader of the MAC SDU, a packet format of an RLC packet included in the MAC SDU. In addition, when delivering the MAC SDU to the RLC layer, the MAC layer entity notifies the RLC layer entity of the packet format of the RLC packet. The RLC layer entity knows, based on a notification result from the MAC layer entity, whether to deliver a data part included in the RLC packet to the PDCP layer entity or the protocol adaptation layer entity.

The foregoing process of the method is: the base station transmits the first indication information to the terminal device to indicate that the radio bearer type of the data that is of the at least one radio bearer and is received by the terminal device after the type of the at least one radio bearer is changed is the first-type radio bearer or the second-type radio bearer.

For uplink data transmission, to enable the base station to know, after the type of the radio bearer is changed, whether a packet received from the radio bearer needs to be delivered to the PDCP layer or the adaptation layer after RLC layer processing, the eRelay UE needs to transmit a notification to the base station.

Based on this, the data processing method on the terminal device side further includes:

the terminal device transmits second indication information to the base station, where the second indication information is used to notify that a radio bearer type of data that is of the at least one radio bearer and is received by the base station after the type of the at least one radio bearer is changed is the first-type radio bearer or the second-type radio bearer.

Optionally, the second indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

On this basis, in a first possible implementation, the terminal device transmits an RRC connection reconfiguration complete message of the at least one radio bearer to the base station, where the RRC connection reconfiguration complete message includes the second indication information.

For example, the terminal notifies, by using the RRC connection reconfiguration complete message, the base station of an RLC sequence number corresponding to an RLC PDU transmitted over the radio bearer whose type is changed, where the RLC PDU has a sequence number corresponding to a first RLC PDU including an RLC SDU encapsulated based on a corresponding packet format after the type change, or the RLC PDU has a sequence number corresponding to a last RLC PDU including an RLC SDU encapsulated based on a corresponding packet format before the type change.

An implementation in which the eRelay UE notifies, by using the RRC connection reconfiguration complete message, the base station of a corresponding RLC sequence number is similar to the implementation in which the base station notifies, by using the RRC connection reconfiguration message, the eRelay UE of a corresponding RLC sequence number in the foregoing process of the method.

It should be noted that, in this embodiment, after the eRelay UE notifies, by using the RRC connection reconfiguration complete message, the base station of a corresponding RLC sequence number, the base station and the eRelay UE side may not or cannot perform concatenation and segmentation operations any longer on an RLC SDU received before the type change and buffered at the current RLC layer.

On this basis, in a second possible embodiment, the terminal device transmits an RLC control protocol data unit of the at least one radio bearer to the base station, where the RLC control protocol data unit includes the second indication information. The RLC control protocol data unit is generated after the RLC layer entity of the at least one radio bearer of the first user equipment determines the sequence number of the last RLC PDU processed before the type change.

Optionally, for uplink data transmission, the terminal device transmits, to the base station by using the RLC layer entity of the radio bearer, the first indication information including the RLC control PDU, and the base station receives, by using the RLC layer entity of the radio bearer, the first indication information including the RLC control PDU and transmitted by the terminal device.

For uplink data transmission, a manner of notifying, by the terminal device by using the RLC control PDU, the base station of the RLC sequence number in the first indication information is similar to the manner of notifying, by the base station, the terminal of the RLC sequence number in the first indication information in the foregoing embodiment.

For uplink data transmission, the base station may know a packet format of an RLC packet based on the RLC sequence number indicated by the RLC control PDU, and know whether to deliver, in sequence to the PDCP layer entity or the protocol adaptation layer entity, an RLC SDU obtained by assembling an RLC PDU.

Optionally, for uplink data transmission, an occasion for generating the control PDU is: generating the RLC control PDU after the RLC layer entity of the terminal device has transmitted the last RLC PDU including the RLC SDU received from the upper layer entity before the type change, or after the RLC layer entity of the terminal device determines the sequence number of the last RLC PDU including the RLC SDU received from the upper layer entity before the type change; or generating the RLC control PDU after the RLC layer entity of the terminal device has transmitted the first RLC PDU including the RLC SDU received from the upper layer entity after the type change, or after the RLC layer entity of the terminal device determines the sequence number of the first RLC PDU including the RLC SDU received from the upper layer entity after the type change.

Optionally, for uplink data transmission, after the type of the radio bearer is changed, the RLC layer entity of the base station does not deliver an RLC SDU obtained by assembling an RLC PDU to a corresponding upper layer entity, that is, the PDCP 1 layer entity or the adaptation layer entity, in sequence until the RLC layer entity of the base station receives the RLC control PDU transmitted by the terminal device.

Optionally, when the second indication information does not include the RLC sequence number, in a possible implementation, the terminal device transmits a MAC protocol data unit to the base station, where the MAC protocol data unit includes a MAC service data unit of the at least one radio bearer, and a MAC subheader corresponding to the MAC service data unit carries the second indication information. For an implementation, refer to related content in the foregoing embodiment. Details are not described again herein.

Based on the same embodiment, there is further provided a data processing method on a base station side, to resolve a technical problem about how to avoid a packet loss when a type of a radio bearer of a terminal device is changed between a first type and a third type.

An embodiment provides a data processing method on a base station side, where the method includes:

a base station configures a type of at least one radio bearer of a terminal device to change from a first type to a second type; and when performing downlink data transmission, the base station transmits first indication information to the terminal device, where the first indication information is used to indicate that a radio bearer type of data that is of the at least one radio bearer and is received by the terminal device after the type of the at least one radio bearer is changed is a first-type radio bearer or a second-type radio bearer.

Optionally, the first indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Further, the base station transmits an RRC connection reconfiguration message of the at least one radio bearer to the terminal device, where the RRC connection reconfiguration message includes the first indication information; or the base station transmits an RLC control protocol data unit of the at least one radio bearer to the terminal device, where the RLC control protocol data unit includes the first indication information.

Optionally, the base station transmits a MAC protocol data unit to the terminal device, where the MAC protocol data unit includes a MAC service data unit of the at least one radio bearer, and a MAC subheader corresponding to the MAC service data unit carries the first indication information.

Optionally, the method further includes:

the base station receives second indication information transmitted by the terminal device, where the second indication information is used to indicate that a radio bearer type of data that is of the at least one radio bearer and is received by the base station after the type of the at least one radio bearer is changed is the first-type radio bearer or the second-type radio bearer.

After the base station obtains the first indication information, the method further includes:

the base station receives an RLC protocol data unit of the at least one radio bearer; and the base station determines an upper layer entity for the RLC protocol data unit of the at least one radio bearer based on the first indication information and a sequence number of the RLC protocol data unit of the at least one radio bearer.

Optionally, the second indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

When the second indication information includes the RLC sequence number, that the base station determines an upper layer entity for the RLC protocol data unit of the at least one radio bearer based on the first indication information and a sequence number of the RLC protocol data unit of the at least one radio bearer includes:

the base station determines, based on the first indication information and the sequence number of the received RLC protocol data unit of the at least one radio bearer, that a radio bearer type of the received RLC protocol data unit of the at least one radio bearer is the first-type radio bearer or the second-type radio bearer; and the base station determines, based on the radio bearer type of the received RLC protocol data unit of the at least one radio bearer, whether the upper layer entity for the received RLC protocol data unit of the at least one radio bearer is a PDCP layer entity or a protocol adaptation layer entity.

Further, the base station receives an RRC connection reconfiguration complete message that is of the at least one radio bearer and is transmitted by the terminal device, where the RRC connection reconfiguration complete message includes the second indication information; or the base station receives an RLC control protocol data unit that is of the at least one radio bearer and is transmitted by the terminal device, where the RLC control protocol data unit includes the second indication information.

Further, the base station receives an RRC connection reconfiguration complete message that is of the at least one radio bearer and is transmitted by the terminal device, where the second indication information is included in the RRC connection reconfiguration complete message.

When the first indication information does not include the RLC sequence number, the base station receives a MAC protocol data unit transmitted by the terminal device, where the MAC protocol data unit includes a MAC service data unit of the at least one radio bearer, and a MAC subheader corresponding to the MAC service data unit includes the second indication information.

When the first indication information does not include the RLC sequence number, the base station determines, based on the indication information in the MAC subheader corresponding to the MAC service data unit, the upper layer entity for the RLC protocol data unit of the at least one radio bearer.

Optionally, the indication information in the MAC subheader includes: when an indication value is 0, it indicates that data included in the MAC SDU should be transmitted to the PDCP layer entity after being processed by an RLC layer entity, or when an indication value is 1, it indicates that data included in the MAC SDU should be transmitted to the protocol adaptation layer entity after being processed by an RLC layer entity, or vice versa.

The data processing method on the base station side is the same as the data processing method on the terminal side. Details are not described again herein.

In addition to the foregoing two data processing methods, embodiments further provide a third data processing method, to implement how to notify that a type of at least one radio bearer of a terminal device is changed from a first-type radio bearer to a second-type radio bearer.

This embodiment provides a third data processing method on a terminal side, where the method includes:

a terminal device receives first configuration information transmitted by a base station, where the first configuration information is used to configure at least one radio bearer of the terminal device to change from a first-type radio bearer to a second-type radio bearer; and the terminal device determines, based on the first configuration information, to change a type of the at least one radio bearer from the first-type radio bearer to the second-type radio bearer.

In a possible embodiment, that the terminal device determines, based on the first configuration information, to change a type of the at least one radio bearer from the first-type radio bearer to the second-type radio bearer includes:

when the terminal device determines, based on an identifier of the at least one radio bearer that is carried in the first configuration information, that the at least one radio bearer is the currently configured radio bearer, and determines that the type of the at least one radio bearer is the first-type radio bearer, if the first configuration information includes third indication information, the terminal device determines to change the type of the at least one radio bearer from the first-type radio bearer to the second-type radio bearer, where the first-type radio bearer includes a packet data convergence protocol PDCP layer entity, a radio link control protocol RLC layer entity, and a logical channel; the second-type radio bearer includes a PDCP layer entity, the adaptation protocol layer entity, an RLC layer entity, and a logical channel; and the third indication information is used to indicate that the type of the radio bearer configured by the terminal device is the second-type radio bearer.

In this embodiment, the terminal device may determine, based on the first configuration information, to change the at least one radio bearer of the terminal device from a third-type radio bearer to the first-type radio bearer.

In a possible embodiment, that the terminal device determines, based on the first configuration information, to change a type of the at least one radio bearer from the first-type radio bearer to the second-type radio bearer includes:

when the terminal device determines, based on an identifier of the at least one radio bearer that is carried in the first configuration information, that the at least one radio bearer is the currently configured radio bearer, and determines that the type of the at least one radio bearer is the first-type radio bearer, if the first configuration information does not include fourth indication information, the terminal device determines to change the type of the at least one radio bearer from the first-type radio bearer to the second-type radio bearer, where the first-type radio bearer includes a PDCP layer entity, the adaptation protocol layer entity, an RLC layer entity, and a logical channel; the second-type radio bearer includes a packet data convergence protocol PDCP layer entity, a radio link control protocol RLC layer entity, and a logical channel; and the fourth indication information is used to indicate that the type of the radio bearer configured by the terminal device is the first-type radio bearer.

In this embodiment, the terminal device may determine, based on the first configuration information, to change the at least one radio bearer of the terminal device from the first-type radio bearer to a third-type radio bearer.

Optionally, the first configuration information is included in an RRC connection reconfiguration message.

This embodiment provides a third data processing method on a base station side, where the method includes:

a base station transmits first configuration information to the terminal device, where the first configuration information is used to configure a type of at least one radio bearer of the terminal device to change from a first-type radio bearer to a second-type radio bearer, and the first configuration information includes an identifier of the at least one radio bearer.

In a possible embodiment, to configure the at least one radio bearer of the terminal device to change from a third-type radio bearer to the first-type radio bearer, that is, if the first-type radio bearer includes a packet data convergence protocol PDCP layer entity, a radio link control protocol RLC layer entity, and a logical channel, and the second-type radio bearer includes a PDCP layer entity, the adaptation protocol layer entity, an RLC layer entity, and a logical channel, the first configuration information includes the identifier of the at least one radio bearer and further includes third indication information, where the third indication information is used to indicate that the type of the radio bearer configured by the terminal device is the second-type radio bearer.

Optionally, the first configuration information is included in an RRC connection reconfiguration message.

In a possible embodiment, to configure the at least one radio bearer of the terminal device to change from the first-type radio bearer to a third-type radio bearer, that is, if the first-type radio bearer includes a PDCP layer entity, an adaptation protocol layer entity, an RLC layer entity, and a logical channel, and the second-type radio bearer includes a packet data convergence protocol PDCP layer entity, a radio link control protocol RLC layer entity, and a logical channel, the first configuration information includes the identifier of the at least one radio bearer but does not include fourth indication information, where the fourth indication information is used to indicate that the type of the radio bearer configured by the terminal device is the first-type radio bearer.

Optionally, the first configuration information is included in an RRC connection reconfiguration message.

The following descriptions are provided with reference to am embodiment.

When a base station configures a new radio bearer for eRelay UE, the base station enables the eRelay UE to know a type of the radio bearer. When the base station reconfigures a radio bearer for the eRelay UE, the base station enables the eRelay UE to know whether to keep a type of the radio bearer unchanged and reconfigure parameters related to the radio bearer or to change a type of the radio bearer through reconfiguration. Currently adding and modifying a data radio bearer and a signaling radio bearer are implemented respectively by adding SRB-ToAdd/Mod information and DRB-ToAdd/Mod information to an RRC connection reconfiguration message.

On this basis, indication information may be configured based on the SRB-ToAdd/Mod information and the DRB-ToAdd/Mod information, instructing to change the currently configured SRB or SRB to from a third-type radio bearer to a first-type radio bearer, and instructing to change the currently configured SRB or SRB from a first-type radio bearer to a third-type radio bearer.

In a possible implementation, for the SRB and the DRB, indication information A is added to information included in the SRB-ToAddMod and DRB-ToAddMod, indicating that the configured radio bearer is the first-type radio bearer and not the third-type radio bearer. For the SRB and the DRB, a piece of indication information B is added to the indication information A, and is used to indicate a type change of the radio bearer. For the DRB, a corresponding EPS bearer ID included in the DRB-ToAddMod is used to indicate that the added radio bearer is not a second-type radio bearer.

Based on the foregoing configuration method, adding and reconfiguring a radio bearer of eRelay UE and indicating a type change are as follows:

Step 1: When eRelay UE receives an RRC connection reconfiguration message transmitted by a base station and including DRB-ToAddMod, for a DRB ID included in the DRB-ToAddMod:

if the DRB is not a DRB currently configured by the eRelay UE, the case corresponds to a case of adding a DRB, and go to step 2; or if the DRB is a DRB currently configured by the eRelay UE, go to step 3.

Step 2: When determining that a DRB is to be added, if the DRB-ToAddMod includes an EPS bearer ID but does not include the indication information A, the case corresponds to a case of adding a third-type DRB;

when determining that a DRB is to be added, if the DRB-ToAddMod does not include an EPS bearer ID but includes the indication information A, the case corresponds to a case of adding a second-type DRB; or when determining that a DRB is to be added, if the DRB-ToAddMod includes both an EPS bearer ID and the indication information A, the case corresponds to a case of adding a first-type DRB.

Step 3: When determining that the DRB is a DRB currently configured by the eRelay UE, reconfigure the DRB, or change a type of the DRB; and further, if the DRB is a third-type DRB, and the DRB-ToAddMod does not include the indication information A, the case corresponds to a case of reconfiguring the DRB;

further, if the DRB is a third-type DRB, and the DRB-ToAddMod includes the indication information A, the case corresponds to a case of changing the DRB from the third-type DR to a first-type DRB;

further, if the DRB is a second-type DRB, and the DRB-ToAddMod includes the indication information A, but the indication information A does not include the indication information B, the case corresponds to a case of reconfiguring the DRB;

further, if the DRB is a second-type DRB, and the DRB-ToAddMod includes the indication information A, and the indication information A includes the indication information B, the case corresponds to a case of changing the DRB from the second-type DRB to a first-type DRB;

further, if the DRB is a first-type DRB, and the DRB-ToAddMod includes the indication information A, but the indication information A does not include the indication information B, the case corresponds to a case of reconfiguring the DRB;

further, if the DRB is a first-type DRB, and the DRB-ToAddMod includes the indication information A, and the indication information A includes the indication information B, the case corresponds to a case of changing the DRB from the first-type DRB to a second-type DRB; or further, if the DRB is a first-type DRB, and the DRB-ToAddMod does not include the indication information A, the case corresponds to a case of changing the DRB from the first-type DRB to a third-type DRB.

An SRB has only a first type and a third type. Therefore, methods for adding or reconfiguring the SRB and configuring a type change are the same as above, except for all configurations related to the second-type radio bearer.

Based on the foregoing method embodiments, embodiments further provide a base station and a terminal device to resolve an existing technical problem about how to avoid a packet loss when a type of a radio bearer is changed between a first type and a third type in the prior art. For related method steps performed by the base station and the terminal device and implementations in the foregoing method embodiments, mutual reference may be made, and repeated content is not described again.

Figure 13:
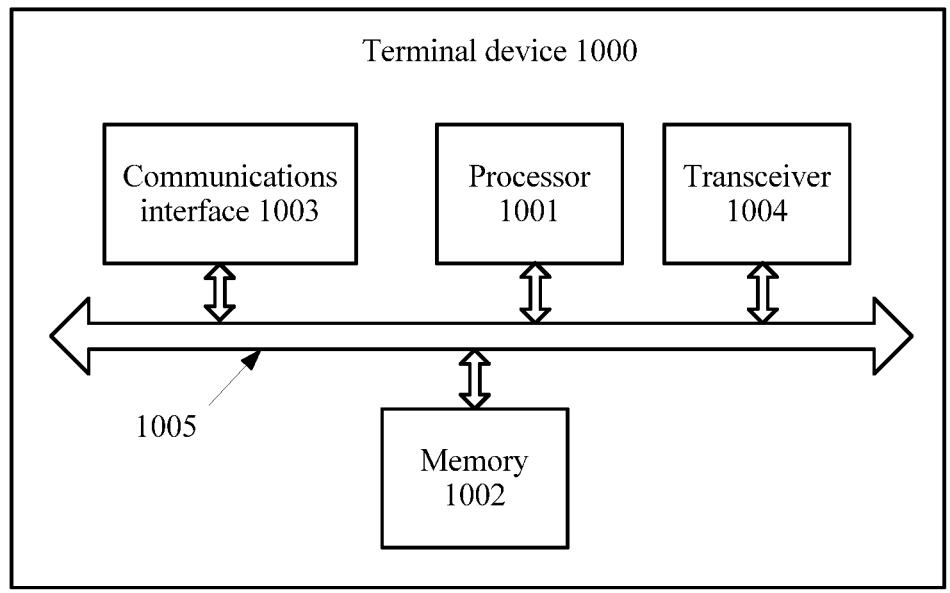
FIG. 13 is a schematic structural diagram of a terminal device according to an embodiment.

Based on the same idea, an embodiment provides a terminal device configured to perform a data processing method. As shown in FIG. 13, the terminal device 1000 includes a processor 1001 and a transceiver 1004.

The transceiver 1004 is configured to support communication between the terminal and a base station, and transmit information or an instruction used in a resource allocation method in the foregoing communications system to the base station.

The processor 1001 is configured to support the terminal in performing corresponding functions in the foregoing data processing method.

Optionally, the terminal device further includes a memory 1002 and a communications interface 1003, where the processor 1001, the memory 1002, the communications interface 1003, and the transceiver 1004 are interconnected by using a bus 1005.

Optionally, the memory is coupled to the processor, and the memory stores a program instruction and data required by the terminal.

The processor 1001 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1002 may include a volatile memory, for example, a random access memory (RAM). The memory may also include a non-volatile memory, for example, a flash memory, a hard disk drive HDD), or a solid-state drive (SSD). The memory may further include a combination of the foregoing types of memories.

The communications interface 1003 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The transceiver 1004 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof.

The bus 1005 may be a peripheral component interconnect (PCI) bus or an extended industry standard architecture (EISA) bus, or the like. The bus may be classified into an address bus, a data bus, a control bus, and the like. For ease of representation, only one thick line is used to represent the bus in the figure, but this does not mean that there is only one bus or only one type of bus. The bus 1005 may include any quantity of interconnect buses and bridges, for example for interconnecting various circuits of one or more processors 1001 represented by the processor and a memory represented by the memory 1002. The bus may further interconnect various other circuits such as a peripheral device, a voltage regulator, and a power management circuit. This is not further described herein. The transceiver 1004 provides a unit configured to communicate with various other devices over a transmission medium. The processor 1001 is responsible for bus architecture management and general processing. The memory 1002 may store data used when the processor 1001 performs an operation.

The processor 1001 and the transceiver 1004 in this embodiment may perform steps related to the terminal device in the first data processing method in this embodiment, or perform steps related to the terminal device in the second data processing method in this embodiment.

When the processor 1001 and the transceiver 1004 in this embodiment perform the steps related to the terminal device in the first data processing method in this embodiment, details included are as follows:

The processor 1001 is configured to: determine to change a type of at least one radio bearer of the terminal device from a first type to a second type; discard a radio link control protocol RLC protocol data unit and/or an RLC service data unit buffered by a transmit side of an RLC layer entity of the at least one radio bearer; and assemble an RLC protocol data unit received by a receive side of the RLC layer entity of the at least one radio bearer into an RLC service data unit, and deliver the RLC service data unit in sequence to an upper layer entity of the RLC layer entity, where the upper layer entity is an upper layer entity of the RLC layer entity before the type of the at least one radio bearer is changed.

Optionally, the processor 1001 is further configured to: stop and reset all timers of the RLC layer entity of the at least one radio bearer; and reset all state variables of the RLC layer entity of the at least one radio bearer to initial values.

Optionally, when the type of the at least one radio bearer is the first type, the upper layer entity of the RLC layer entity is a packet data convergence protocol PDCP layer entity, or when the type of the at least one radio bearer is the second type, the upper layer entity of the RLC layer entity is an adaptation protocol layer entity; or when the type of the at least one radio bearer is the first type, the upper layer entity of the RLC layer entity is an adaptation protocol layer entity, or when the type of the at least one radio bearer is the second type, the upper layer entity of the RLC layer entity is the PDCP layer entity.

Optionally, if the at least one radio bearer is a data radio bearer in RLC acknowledged mode or a signaling radio bearer in RLC acknowledged mode, the processor 1001 is further configured to: retransmit a PDCP protocol data unit that is not successfully transmitted by the PDCP layer entity of the at least one radio bearer, where the PDCP protocol data unit is a PDCP protocol data unit that is delivered to a lower layer entity before the type of the at least one radio bearer is changed but successful reception of which is not fed back or acknowledged by the lower layer entity, and the lower layer entity is a lower layer entity of the PDCP layer entity before the type of the at least one radio bearer is changed; and generate and transmit, by the terminal device, a PDCP status report, where the PDCP status report is used to notify a base station of a sequence number of a PDCP service data unit that is not successfully received.

Optionally, if the at least one radio bearer is a signaling radio bearer in RLC acknowledged mode, the processor 1001 is further configured to: reset a value of a variable used to record a sequence number of a next transmitted PDCP service data unit and a value of a hyper frame number in the PDCP entity of the at least one radio bearer to 0; and reset a value of a variable used to record a sequence number of a next received PDCP service data unit and a value of a hyper frame number in the PDCP entity of the at least one radio bearer to 0.

Optionally, the processor 1001 is further configured to reset a media access control MAC layer entity.

Optionally, the processor 1001 is further configured to perform at least one of the following features:

clearing buffers of all uplink HARQ processes of a media access control MAC layer entity;

setting new data indication information of all uplink HARQ processes to 0;

clearing buffers of all downlink HARQ processes of a media access control MAC layer entity; and for each downlink HARQ process, considering a transport block subsequently received in the downlink HARQ process as first transmission of the transport block.

Optionally, the processor 1001 is further configured to: receive a MAC protocol data unit after the type of the at least one radio bearer is changed; and if the MAC protocol data unit is initially received before the type of the at least one radio bearer is changed, and the MAC protocol data unit includes a MAC service data unit of the at least one radio bearer, discard the MAC service data unit of the at least one radio bearer.

When the processor 1001 and the transceiver 1004 in this embodiment perform the steps related to the terminal device in the second data processing method in this embodiment, details included are as follows:

The processor 1001 and the transceiver 1004 of the terminal 1000 perform the following functions:

The processor 1001 is configured to: determine to change a type of at least one radio bearer of the terminal device from a first type to a second type; and obtain first indication information, where the first indication information is used to indicate that a radio bearer type of data that is of the at least one radio bearer and is received by the terminal device after the type of the at least one radio bearer is changed is a first-type radio bearer or a second-type radio bearer.

Optionally, the first indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Optionally, the transceiver 1004 is configured to receive an RLC protocol data unit that is of the at least one radio bearer and is transmitted by a base station; and the processor 1001 is further configured to: determine, based on the first indication information and a sequence number of the received RLC protocol data unit of the at least one radio bearer, that a radio bearer type of the received RLC protocol data unit of the at least one radio bearer is the first-type radio bearer or the second-type radio bearer; and determine, based on the radio bearer type of the received RLC protocol data unit of the at least one radio bearer, an upper layer entity for the received RLC protocol data unit of the at least one radio bearer, where the upper layer entity is an upper layer entity of an RLC protocol layer of the at least one radio bearer before the type of the at least one radio bearer is changed or after the type of the at least one radio bearer is changed.

Optionally, the transceiver 1004 is configured to: receive an RRC connection reconfiguration message that is of the at least one radio bearer and is transmitted by the base station, where the RRC connection reconfiguration message includes the first indication information; or receive an RLC control protocol data unit that is of the at least one radio bearer and is transmitted by the base station, where the RLC control protocol data unit includes the first indication information.

Optionally, the transceiver 1004 is configured to: receive a MAC protocol data unit transmitted by the base station, where the MAC protocol data unit includes a MAC service data unit of the at least one radio bearer, and a MAC subheader corresponding to the MAC service data unit carries the first indication information.

Optionally, the transceiver 1004 is further configured to: transmit second indication information to the base station, where the second indication information is used to notify that a radio bearer type of data that is of the at least one radio bearer and is received by the base station after the type of the at least one radio bearer is changed is the first-type radio bearer or the second-type radio bearer.

Optionally, the second indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Optionally, the transceiver 1004 is configured to: transmit an RRC connection reconfiguration complete message of the at least one radio bearer to the base station, where the RRC connection reconfiguration complete message includes the second indication information; or transmit an RLC control protocol data unit of the at least one radio bearer to the base station, where the RLC control protocol data unit includes the second indication information.

Optionally, the transceiver 1004 is configured to transmit a MAC protocol data unit to the base station, where the MAC protocol data unit includes a MAC service data unit of the at least one radio bearer, and a MAC subheader corresponding to the MAC service data unit carries the second indication information.

When the processor 1001 and the transceiver 1004 in this embodiment may further perform the steps related to the terminal device in the third data processing method in this embodiment, details included are as follows:

The transceiver 1004 is configured to receive first configuration information transmitted by a base station, where the first configuration information is used to configure at least one radio bearer of the terminal device to change from a first-type radio bearer to a second-type radio bearer; and the processor 1001 is configured to determine, based on the first configuration information, to change a type of the at least one radio bearer from the first-type radio bearer to the second-type radio bearer.

Optionally, the processor 1001 is configured to: determine, based on an identifier of the at least one radio bearer that is carried in the first configuration information, that the at least one radio bearer is the currently configured radio bearer, and when determining that the type of the at least one radio bearer is the first-type radio bearer, if the first configuration information includes third indication information, determine to change the type of the at least one radio bearer from the first-type radio bearer to the second-type radio bearer, where the first-type radio bearer includes a packet data convergence protocol PDCP layer entity, a radio link control protocol RLC layer entity, and a logical channel; the second-type radio bearer includes a PDCP layer entity, the adaptation protocol layer entity, an RLC layer entity, and a logical channel; and the third indication information is used to indicate that the type of the radio bearer configured by the terminal device is the second-type radio bearer.

Optionally, the processor 1001 is configured to: determine, by the terminal device based on an identifier of the at least one radio bearer that is carried in the first configuration information, that the at least one radio bearer is the currently configured radio bearer, and when determining that the type of the at least one radio bearer is the first-type radio bearer, if the first configuration information does not include fifth indication information, determine to change the type of the at least one radio bearer from the first-type radio bearer to the second-type radio bearer, where the first-type radio bearer includes a PDCP layer entity, the adaptation protocol layer entity, an RLC layer entity, and a logical channel; the second-type radio bearer includes a packet data convergence protocol PDCP layer entity, a radio link control protocol RLC layer entity, and a logical channel; and the fifth indication information is used to indicate that the type of the radio bearer configured by the terminal device is the first-type radio bearer.

In a possible implementation, the terminal includes a number of functional modules, configured to perform the method steps related to the terminal in the foregoing embodiments, to resolve a technical problem about how to avoid a packet loss.

Figure 14:
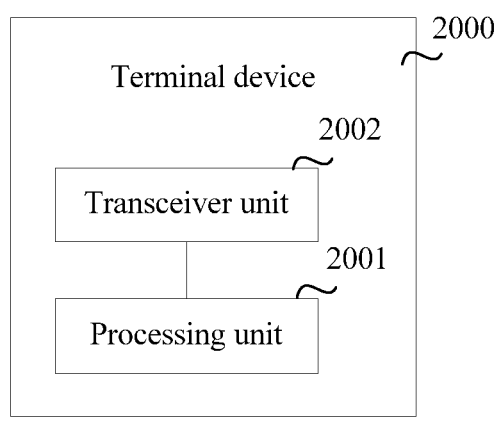
FIG. 14 is a schematic structural diagram of a terminal device according to an embodiment.

As shown in FIG. 14, a terminal 2000 includes a processing unit 2001 and a transceiver unit 2002. It can be noted that, all operations performed by the processing unit 2001 or the transceiver unit 2002 may be considered as operations of the terminal 2000. The processing unit 2001 in the terminal 2000 may be implemented by a processor in the terminal 2000, and the transceiver unit 2002 may be implemented by a transceiver in the terminal 2000.

For detailed descriptions about functions of apparatuses or components in the terminal, refer to related content in the foregoing embodiment. Details are not described again herein.

Figure 15:
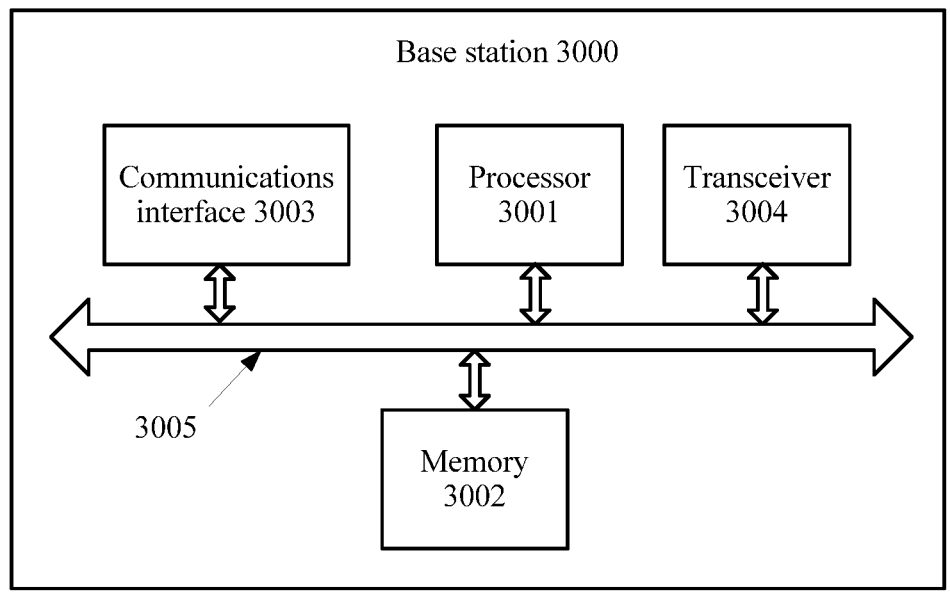
FIG. 15 is a schematic structural diagram of a base station according to an embodiment

Based on the same idea, this embodiment provides a base station 3000. As shown in FIG. 15, the base station 3000 includes a processor 3001 and a transceiver 3004.

The transceiver 3004 is configured to support communication between a terminal and the base station, and transmit information or an instruction used in the foregoing data processing method to the terminal device.

The processor 3001 is configured to support the base station in performing corresponding functions in the foregoing data processing method.

Optionally, the base station further includes a memory 3002 and a communications interface 3003, where the processor 3001, the memory 3002, the communications interface 3003, and the transceiver 3004 are interconnected by using a bus 3005.

Optionally, the memory is coupled to the processor, and the memory stores a program instruction and data required by the base station.

The processor 3001 may be a CPU, an NP, or a combination of a CPU and an NP. The processor may further include a hardware chip. The hardware chip may be an ASIC, a PLD, or a combination thereof. The PLD may be a CPLD, an FPGA, GAL), or any combination thereof.

The memory 3002 may include a volatile memory, for example, a RAM). The memory may also include a non-volatile memory, for example, a flash memory, an HDD), or an SSD. The memory may further include a combination of the foregoing types of memories.

The communications interface 3003 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The transceiver 3004 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof.

The bus 3005 may be a peripheral component interconnect PCI bus or an extended industry standard architecture EISA bus, or the like. The bus may be classified into an address bus, a data bus, a control bus, and the like. For ease of representation, only one thick line is used to represent the bus in the figure, but this does not mean that there is only one bus or only one type of bus. The bus 3005 may include any quantity of interconnect buses and bridges, for example for interconnecting various circuits of one or more processors 3001 represented by the processor and a memory represented by the memory 3002. The bus may further interconnect various other circuits such as a peripheral device, a voltage regulator, and a power management circuit. This is not further described herein. The transceiver 3004 provides a unit configured to communicate with various other devices over a transmission medium. The processor 3001 is responsible for bus architecture management and general processing. The memory 3002 may store data used when the processor 3001 performs an operation.

The processor 3001 and the transceiver 3004 in this embodiment may be configured to perform steps related to the base station in the first data processing method in this embodiment, or perform steps related to the base station in the second data processing method in this embodiment, or perform steps related to the base station in the third data processing method in this embodiment.

When the processor 3001 and the transceiver 3004 in this embodiment are configured to perform the steps related to the base station in the first data processing method in this embodiment, details included are as follows:

The transceiver 3004 is configured to receive a PDCP status report transmitted by a terminal device, where the status report is used to notify a base station of a sequence number of a PDCP service data unit that is not successfully received.

When the processor 3001 and the transceiver 3004 in this embodiment are configured to perform the steps related to the base station in the second data processing method in this embodiment, details included are as follows: For example, the transceiver 3004 is configured to transmit first indication information to a terminal device, where the first indication information is used to indicate that a radio bearer type of data that is of at least one radio bearer and is received by the terminal device after a type of the at least one radio bearer of the terminal device is changed is a first-type radio bearer or a second-type radio bearer.

Optionally, the first indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

Optionally, the transceiver 3004 is configured to: transmit an RRC connection reconfiguration message of the at least one radio bearer to the terminal device, where the RRC connection reconfiguration message includes the first indication information; or transmit an RLC control protocol data unit of the at least one radio bearer to the terminal device, where the RLC control protocol data unit includes the first indication information.

Optionally, the transceiver 3004 is configured to transmit a MAC protocol data unit to the terminal device, where the MAC protocol data unit includes a MAC service data unit of the at least one radio bearer, and a MAC subheader corresponding to the MAC service data unit carries the first indication information. Optionally, the transceiver 3004 is configured to receive second indication information transmitted by the terminal device, where the second indication information is used to indicate that a radio bearer type of data that is of the at least one radio bearer and is received by the base station after the type of the at least one radio bearer is changed is the first-type radio bearer or the second-type radio bearer.

Optionally, the second indication information includes an RLC sequence number, and the RLC sequence number is a sequence number of an RLC protocol data unit of the at least one radio bearer, where the RLC protocol data unit is a last RLC protocol data unit including an RLC service data unit encapsulated based on a format of the first-type radio bearer, or the RLC protocol data unit is a first RLC protocol data unit including an RLC service data unit encapsulated based on a format of the second-type radio bearer.

The processor 3001 is configured to: when the second indication information includes the RLC sequence number, determine, based on the first indication information and a sequence number of the received RLC protocol data unit of the at least one radio bearer, that a radio bearer type of the received RLC protocol data unit of the at least one radio bearer is the first-type radio bearer or the second-type radio bearer; and determine, based on the radio bearer type of the received RLC protocol data unit of the at least one radio bearer, whether an upper layer entity for the received RLC protocol data unit of the at least one radio bearer is a PDCP layer entity or a protocol adaptation layer entity.

Optionally, the transceiver 3004 is configured to: receive an RRC connection reconfiguration complete message that is of the at least one radio bearer and is transmitted by the terminal device, where the RRC connection reconfiguration complete message includes the second indication information; or receive, by the base station, an RLC control protocol data unit that is of the at least one radio bearer and is transmitted by the terminal device, where the RLC control protocol data unit includes the second indication information.

Optionally, the transceiver 3004 is configured to receive an RRC connection reconfiguration complete message that is of the at least one radio bearer and is transmitted by the terminal device, where the RRC connection reconfiguration complete message of the at least one radio bearer includes the second indication information.

Optionally, the transceiver 3004 is configured to receive a MAC protocol data unit that is of the at least one radio bearer and transmitted by the terminal device, where the MAC protocol data unit includes a MAC service data unit of the at least one radio bearer, and a MAC subheader corresponding to the MAC service data unit carries the second indication information.

When the processor 3001 and the transceiver 3004 in this embodiment are configured to perform the steps related to the base station in the third data processing method in this embodiment, details included are as follows:

The transceiver 3004 is configured to transmit first configuration information to a terminal device, where the first configuration information is used to configure at least one radio bearer of the terminal device to change from a first-type radio bearer to a second-type radio bearer.

Optionally, if the first-type radio bearer includes a packet data convergence protocol PDCP layer entity, a radio link control protocol RLC layer entity, and a logical channel, and the second-type radio bearer includes a PDCP layer entity, the adaptation protocol layer entity, an RLC layer entity, and a logical channel, the first configuration information includes an identifier of the at least one radio bearer and further includes third indication information, where the third indication information is used to indicate that a type of the radio bearer configured by the terminal device is the second-type radio bearer.

Optionally, if the first-type radio bearer includes a PDCP layer entity, the adaptation protocol layer entity, an RLC layer entity, and a logical channel, and the second-type radio bearer includes a packet data convergence protocol PDCP layer entity, a radio link control protocol RLC layer entity, and a logical channel, the first configuration information includes an identifier of the at least one radio bearer but does not include fifth indication information, where the fifth indication information is used to indicate that a type of the radio bearer configured by the terminal device is the first-type radio bearer. In a possible implementation, the base station includes a number of functional modules, configured to perform the method steps related to the base station in the embodiments.

Figure 16:
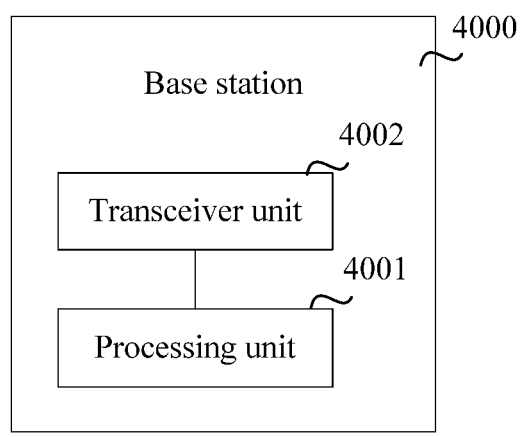
FIG. 16 is a schematic structural diagram of a base station according to an embodiment.

As shown in FIG. 16, a base station 4000 includes a processing unit 4001 and a transceiver unit 4002. All operations performed by the processing unit 4001 or the transceiver unit 4002 may be considered as operations of the base station 4000. The processing unit 4001 in the base station 4000 may be implemented by a processor in the base station 4000, and the transceiver unit 4002 may be implemented by a transceiver in the terminal 4000.

For detailed descriptions about functions of apparatuses or components in the base station, refer to related content in other embodiments. Details are not described again herein.

Based on the same idea, an embodiment provides a computer-readable storage medium, where the computer-readable storage medium stores an instruction, and when the instruction runs on a computer, the computer performs method steps related to the terminal in each embodiment.

Based on the same idea, an embodiment provides a computer-readable storage medium, where the computer-readable storage medium stores an instruction, and when the instruction runs on a computer, the computer performs method steps related to the base station in each embodiment.

Based on the same idea, an embodiment provides a computer program product including an instruction, so that when the computer program product runs on a computer, the computer performs method steps related to the terminal in each embodiment.

Based on the same idea, an embodiment provides a computer program product including an instruction, so that when the computer program product runs on a computer, the computer performs method steps related to the base station in each embodiment.

A person or ordinary skill in the art may clearly understand that for descriptions about each embodiment provided herein, mutual reference may be made. For the purpose of convenient and brief description, functions of each apparatus and device provided by the embodiments and performed steps, refer to the descriptions about the method embodiments. Details are not described again herein.

A person of ordinary skill in the art may further understand that various illustrative logical blocks and steps that are listed in the embodiments may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments.

The various illustrative logical blocks, modules, and circuits described in the embodiments may implement or operate the described functions by using a general processing unit, a digital signal processing unit, an ASIC, an FPGA or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may be implemented by a combination of computing apparatuses, such as a digital signal processing unit and a microprocessing unit, a number of microprocessing units, one or more microprocessing units with a digital signal processing unit core, or any other similar configuration.

Steps of the methods or algorithm steps described in the embodiments may be directly embedded into hardware, a software module executed by a processing unit, or a combination thereof. The software module may be stored in a RAM memory, a flash memory, a ROM memory, an EPROM memory, an EEPROM memory, a register, a hard disk, a removable disk, a CD-ROM, or a storage medium of any other form in the art. For example, the storage medium may connect to a processing unit so that the processing unit may read information from the storage medium and write information to the storage medium. Optionally, the storage medium may further be integrated into a processing unit. The processing unit and the storage medium may be disposed in an ASIC, and the ASIC may be disposed in a user terminal. Optionally, the processing unit and the storage medium may be disposed in different components of the user terminal.

In one or more illustrative examples, the functions described in the embodiments herein may be implemented by using hardware, software, firmware, or any combination thereof. If the functions are implemented by software, the functions may be stored in a computer-readable medium or are transmitted to a computer-readable medium in a form of one or more instructions or code. The computer-readable medium is a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM or another optical disc storage, a disk storage or another magnetic storage apparatus, or any other medium that may be used to carry or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disc and the disk include a compressed disk, a laser disc, an optical disc, a DVD, a floppy disk, and a Blu-ray disc. The disk generally copies data by a magnetic capabilities, and the disc generally copies data optically by a laser. The foregoing combination may also be included in the computer-readable medium.

According to the foregoing description, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A data processing method, comprising:
determining, by a terminal device, to change a type of at least one radio bearer of the terminal device from a first type to a second type;
discarding, by the terminal device, a radio link control (RLC) protocol data unit and/or an RLC service data unit buffered by a transmit side of an RLC layer entity of the at least one radio bearer; and
assembling, by the terminal device, an RLC protocol data unit received by a receive side of the RLC layer entity of the at least one radio bearer into an RLC service data unit, and delivering the RLC service data unit in sequence to an upper layer entity of the RLC layer entity, wherein the upper layer entity is an upper layer entity of the RLC layer entity before the type of the at least one radio bearer is changed,
wherein if the at least one radio bearer is a signaling radio bearer in RLC acknowledged mode, the method further comprises:
resetting, by the terminal device, a value of a variable used to record a sequence number of a next transmitted packet data convergence protocol (PDCP) service data unit and a value of a hyper frame number in a PDCP entity of the at least one radio bearer to 0; and
resetting, by the terminal device, a value of a variable used to record a sequence number of a next received PDCP service data unit and a value of a hyper frame number in the PDCP entity of the at least one radio bearer to 0.

2. The method according to claim 1, further comprising:
stopping and resetting, by the terminal device, all timers of the RLC layer entity of the at least one radio bearer; and
resetting, by the terminal device, all state variables of the RLC layer entity of the at least one radio bearer to initial values.

3. The method according to claim 2, wherein
when the type of the at least one radio bearer is the first type, the upper layer entity of the RLC layer entity is a packet data convergence protocol (PDCP) layer entity, or when the type of the at least one radio bearer is the second type, the upper layer entity of the RLC layer entity is an adaptation protocol layer entity; or
when the type of the at least one radio bearer is the first type, the upper layer entity of the RLC layer entity is an adaptation protocol layer entity, or when the type of the at least one radio bearer is the second type, the upper layer entity of the RLC layer entity is the PDCP layer entity.

4. The method according to claim 1, wherein if the at least one radio bearer is a data radio bearer in RLC acknowledged mode or a signaling radio bearer in RLC acknowledged mode, the method further comprises:
retransmitting, by the terminal device, a PDCP protocol data unit that is not successfully transmitted by the PDCP layer entity of the at least one radio bearer, wherein the PDCP protocol data unit is a PDCP protocol data unit that is delivered to a lower layer entity before the type of the at least one radio bearer is changed but successful reception of which is not fed back or acknowledged by the lower layer entity, and the lower layer entity is a lower layer entity of the PDCP layer entity before the type of the at least one radio bearer is changed; and generating and transmitting, by the terminal device, a PDCP status report, wherein the PDCP status report is used to notify a base station of a sequence number of a PDCP service data unit that is not successfully received.

5. The method according claim 1, further comprising:
resetting, by the terminal device, a media access control (MAC) layer entity.

6. The method according to claim 1, further comprising at least one of the following features:
clearing, by the terminal device, buffers of all uplink hybrid automatic repeat request (HARQ) processes of a media access control MAC layer entity;

setting, by the terminal device, new data indication information of all uplink HARQ processes to 0;

clearing, by the terminal device, buffers of all downlink HARQ processes of a media access control MAC layer entity; and for each downlink HARQ process, considering, by the terminal device, a transport block subsequently received in the downlink HARQ process as first transmission of the transport block.

7. The method according to claim 1, further comprising:
receiving, by a media access control MAC layer entity of the terminal device, a MAC protocol data unit after the type of the at least one radio bearer is changed; and if the MAC protocol data unit is initially received before the type of the at least one radio bearer is changed, and the MAC protocol data unit comprises a MAC service data unit of the at least one radio bearer, discarding the MAC service data unit of the at least one radio bearer.

* * * * *